(12) United States Patent
Mantyjarvi et al.

(10) Patent No.: US 12,282,982 B2
(45) Date of Patent: Apr. 22, 2025

(54) METHOD AND SYSTEM FOR IN-VEHICLE SENSOR RANGE AND FOV AR VISUALIZATION

(71) Applicant: DRNC Holdings, Inc., Wilmington, DE (US)

(72) Inventors: Jani Mantyjarvi, Oulunsalo (FI); Jussi Ronkainen, Oulu (FI); Mikko Tarkiainen, Tampere (FI)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/526,213

(22) Filed: Dec. 1, 2023

(65) Prior Publication Data

US 2024/0177366 A1 May 30, 2024

Related U.S. Application Data

(63) Continuation of application No. 16/614,296, filed as application No. PCT/US2018/032747 on May 15, 2018, now abandoned.
(Continued)

(51) Int. Cl.
*G06T 11/00* (2006.01)
*B60W 50/14* (2020.01)
(Continued)

(52) U.S. Cl.
CPC .............. *G06T 11/00* (2013.01); *B60W 50/14* (2013.01); *B60W 60/001* (2020.02);
(Continued)

(58) Field of Classification Search
CPC ..... G06T 11/00; B60W 60/001; B60W 50/14; B60W 2556/50; B60W 2420/408;
(Continued)

(56) References Cited

U.S. PATENT DOCUMENTS 6,859,148 B2    2/2005   Miller et al.
8,589,014 B2   11/2013   Fairfield et al.
(Continued)

FOREIGN PATENT DOCUMENTS

CN   103703496 A   4/2014
CN   106494309 A   3/2017
(Continued)

OTHER PUBLICATIONS

Sawabe, Taishi, "Comfortable Autonomous Navigation Based on Collision Prediction in Blind Occluded Regions", Nov. 2015, Proceedings of the 2015 IEEE International Conference on Vehicular Electronics and Safety, pp. 75-80 (Year: 2015).*
(Continued)

*Primary Examiner* — Terrell M Robinson
(74) *Attorney, Agent, or Firm* — Chris Kolefas

(57) ABSTRACT

Some embodiments of a method disclosed herein may include: receiving a predicted driving route, sensor ranges of sensors on an autonomous vehicle (AV), and sensor field-of-view (FOV) data; determining whether minimum sensor visibility requirements are met along the predicted driving route; predicting blind areas along the predicted driving route, wherein the predicted blind areas are determined to have potentially diminished sensor visibility; and displaying an augmented reality (AR) visualization of the blind areas using an AR display device.

10 Claims, 14 Drawing Sheets

Related U.S. Application Data

(60) Provisional application No. 62/509,386, filed on May 22, 2017.

(51) Int. Cl.
  *B60W 60/00* (2020.01)
  *G01C 21/36* (2006.01)
  *G05D 1/00* (2006.01)

(52) U.S. Cl.
  CPC ......... *G01C 21/365* (2013.01); *G05D 1/0088* (2013.01); *B60W 2050/146* (2013.01); *B60W 2420/403* (2013.01); *B60W 2420/408* (2024.01); *B60W 2556/50* (2020.02)

(58) Field of Classification Search
  CPC ...... B60W 2050/146; B60W 2420/403; G01C 21/365; G05D 1/0088
  See application file for complete search history.

(56) References Cited

U.S. PATENT DOCUMENTS

| | | | |
|---|---|---|---|
| 8,676,431 B1 | 3/2014 | Mariet et al. | |
| 9,170,332 B2 | 10/2015 | Shimizu | |
| 9,367,065 B2 | 6/2016 | Dolgov et al. | |
| 9,403,482 B2 | 8/2016 | Shahraray et al. | |
| 9,493,157 B2 | 11/2016 | Prokhorov | |
| 10,591,924 B1* | 3/2020 | Ferguson | B60W 60/00186 |
| 10,845,202 B1* | 11/2020 | Urmson | G05D 1/0278 |
| 2006/0085131 A1 | 4/2006 | Yopp et al. | |
| 2007/0182528 A1 | 8/2007 | Breed et al. | |
| 2009/0153665 A1 | 6/2009 | Linsenmaier et al. | |
| 2009/0326819 A1 | 12/2009 | Taguchi | |
| 2012/0310466 A1* | 12/2012 | Fairfield | G05D 1/0246 701/28 |
| 2013/0080290 A1 | 3/2013 | Kamm et al. | |
| 2013/0297199 A1 | 11/2013 | Kapp et al. | |
| 2014/0204117 A1 | 7/2014 | Kinnebrew et al. | |
| 2014/0214255 A1 | 7/2014 | Dolgov et al. | |
| 2014/0236652 A1 | 8/2014 | Argue et al. | |
| 2014/0330478 A1 | 11/2014 | Cullinane et al. | |
| 2015/0022426 A1 | 1/2015 | Ng-Thow-Hing et al. | |
| 2016/0003636 A1* | 1/2016 | Ng-Thow-Hing | G01C 21/365 701/418 |
| 2016/0091323 A1 | 3/2016 | Macgougan et al. | |
| 2016/0214647 A1 | 7/2016 | Weisswange et al. | |
| 2016/0327953 A1 | 11/2016 | Nilsson et al. | |
| 2016/0375911 A1 | 12/2016 | Coelingh et al. | |
| 2016/0379411 A1 | 12/2016 | Harbach et al. | |
| 2017/0025017 A1 | 1/2017 | Thomas et al. | |
| 2017/0116862 A1 | 4/2017 | Inoue | |
| 2017/0269599 A1 | 9/2017 | Ansari et al. | |
| 2018/0328752 A1 | 11/2018 | Tomatsu et al. | |
| 2019/0325659 A1 | 10/2019 | Harbach et al. | |
| 2020/0361482 A1 | 11/2020 | Choi et al. | |

FOREIGN PATENT DOCUMENTS

| | | |
|---|---|---|
| CN | 106502248 A | 3/2017 |
| JP | 2006227811 A | 8/2006 |
| JP | 2008293099 A | 12/2008 |
| JP | 2012053533 A | 3/2012 |
| KR | 20160134016 A | 11/2016 |
| WO | WO2014130049 A1 | 8/2014 |
| WO | WO016109635 A1 | 7/2016 |
| WO | WO2016210257 A1 | 12/2016 |

OTHER PUBLICATIONS

Ferrari, "Augmented Reality Showroom App". Web Archive dated Mar. 23, 2016, available at: https://web.archive.org/web/20160323003356/http://zspace.com.au/Ferrari-AR-Showroom-App, 5 pages.

Lin, Che-Tsung, et al. "Front Vehicle Blind Spot Translucentization Based on Augmented Reality". IEEE 78th Vehicular Technology Conference (2013), 6 pages.

International Preliminary Report on Patentability for PCT/US2018/032747 issued on Nov. 26, 2019, 8 pages.

Seif, Heiko G., et al., "Autonomous Driving in the iCity-HD Maps as a Key Challenge", Science Direct, Engineering, vol. 2, No. 2, Jun. 2016, pp. 159-162.

BEO Automotive, "ibeo.HAD Feature Fusion". Web Archive dated Nov. 18, 2016, retrieved from: hllps://web.rchive.org/web/20161118104830/http://www.ibeo-as.com/had/ibeo-feature-fusion/, 5 pages.

Gao et al., "An Entry Point Based Local Path Planning for Mobile Robot with Blind Zone", Applied Mechanics and Materials 373 (2013): 197-200.

* cited by examiner

```
                                    1700
                                   ╱

┌─────────────────────────────────────────────┐
│ RECEIVING A PREDICTED ROUTE, SENSOR RANGES OF│
│  SENSORS ON A VEHICLE AND SENSOR FIELD-OF-VIEW│
│                 (FOV) DATA                   │
│                    1702                      │
└─────────────────────────────────────────────┘
                     │
                     ▼
┌─────────────────────────────────────────────┐
│  DETERMINING WHETHER MINIMUM SENSOR VISIBILITY│
│   REQUIREMENTS ARE MET ALONG THE PREDICTED   │
│                DRIVING ROUTE                 │
│                    1704                      │
└─────────────────────────────────────────────┘
                     │
                     ▼
┌─────────────────────────────────────────────┐
│   PREDICTING BLIND AREAS ALONG THE PREDICTED │
│   DRIVING ROUTE, WHEREIN THE PREDICTED BLIND │
│   AREAS ARE DETERMINED TO HAVE POTENTIALLY   │
│          DIMINISHED SENSOR VISIBILITY        │
│                    1706                      │
└─────────────────────────────────────────────┘
                     │
                     ▼
┌─────────────────────────────────────────────┐
│       DISPLAYING AN AUGMENTED REALITY (AR)   │
│  VISUALIZATION OF THE BLIND AREAS USING AN AR│
│                DISPLAY DEVICE                │
│                    1708                      │
└─────────────────────────────────────────────┘
```

PREDICTING BLIND AREAS ALONG A DRIVING ROUTE OF AN AUTONOMOUS VEHICLE (AV) BASED ON EXPECTED LIMITATIONS OF SENSORS
1802

PROVIDING AN INDICATION OF THE PREDICTED BLIND AREAS USING AUGMENTED REALITY (AR) VISUALIZATIONS AS THE AV TRAVELS ALONG THE DRIVING ROUTE
1804

METHOD AND SYSTEM FOR IN-VEHICLE SENSOR RANGE AND FOV AR VISUALIZATION

CROSS-REFERENCE TO RELATED APPLICATIONS

This application is a Continuation of U.S. application Ser. No. 16/614,296, filed Nov. 15, 2019, which is a National Phase entry under 35 U.S.C. § 371 of International Application No. PCT/US2018/032747 filed May 15, 2018, which claims the benefit of U.S. Provisional Patent Application Ser. No. 62/509,386, filed May 22, 2017, which is incorporated by reference herein in its entirety.

BACKGROUND

Among the potential benefits of autonomous ca is a significant reduction in traffic collisions, the resulting injuries, and related costs, including a lower need for insurance. According to some projections, autonomous cars may offer major increases in traffic flowrate; enhanced mobility for children, the elderly, disabled and poor people; relief of travelers from driving and navigation chores; lower fuel consumption; significantly reduced needs for parking space in cities; a reduction in crime; and the facilitation of different business models for mobility as a service, especially those involved in the sharing economy.

Advanced user interface technologies, such as augmented reality (AR) headsets and heads-up displays (HUDs), are becoming increasingly desirable for presenting relevant contextual data to people in real-world settings. For years, many luxury vehicles have been able to present speedometer information as a see-through projection onto the car's windshield. Motorcycle helmets that project GPS route information as a see-through image on the visor exist as well. These systems have the added benefit, in the context of vehicular operation, of being minimally intrusive to the user's engagement with the real-world environment.

SUMMARY

Some embodiments of a method may include: receiving a predicted driving route, sensor ranges of sensors on a vehicle, and sensor field-of-view (FOV) data; determining whether minimum sensor visibility requirements are met along the predicted driving route; predicting blind areas along the predicted driving route, wherein the predicted blind areas are determined to have potentially diminished sensor visibility; and displaying an augmented reality (AR) or mixed reality (MR) visualization of the blind areas using an AR or MR display device.

For some embodiments, the vehicle is a partially-autonomous vehicle with at least one of a manual mode or a driver assist mode.

For some embodiments, the vehicle is a fully-autonomous vehicle.

Some embodiments of the method further may include: receiving map data; and updating blind areas, wherein updating the blind areas may include comparing received map data with local dynamic map data.

Some embodiments of the method further may include: receiving blind area information from a second vehicle; and determining that the second vehicle is in a blind area based on the blind area information.

Some embodiments of the method further may include responsive to determining that the second vehicle is in the blind area, displaying an icon indicating the second vehicle is in the blind area.

Some embodiments of the method further may include identifying blind area reduction techniques; and responsive to identifying blind area reduction techniques, moving the vehicle from a first position to a second position.

Some embodiments of the method further may include responsive to determining that the blind areas are predicted to overlap a visibility area threshold, updating a driving mode of the AV, wherein the minimum sensor visibility requirements include the visibility area threshold.

For some embodiments, predicting blind areas may include determining visibility areas at a plurality of locations along the predicted driving route.

For some embodiments, calculating visibility areas may include simulating sensor visibility at a plurality of locations along the predicted driving route using three-dimensional (3D) map data.

For some embodiments, predicting blind areas may include continually estimating locations of blind areas based on a plurality of sensor readings.

Some embodiments of the method further may include: tracking an orientation of the vehicle, wherein predicting blind areas is based on the orientation of the vehicle.

For some embodiments, displaying the AR visualization of the blind areas includes projecting the AR visualization using an in-vehicle augmented reality projection system to display the AR visualization.

For some embodiments, displaying the AR visualization of the blind areas includes overlaying highlighting on a map indicating the blind areas.

For some embodiments, displaying the AR visualization of the blind areas includes displaying an outline of areas on a map indicating the blind areas.

Some embodiments of the apparatus further may include: a set of sensors; a blind area prediction module configured to identify potential blind areas; a driving mode selection module configured to select a driving mode responsive to a comparison of the potential blind areas with a visibility area threshold; a communication module configured to receive vehicle-to-vehicle (V2V) messages; and an augmented reality (AR) display device.

Some embodiments of a method may include: determining whether minimum sensor visibility requirements are met along a driving route of an autonomous vehicle (AV); predicting blind areas along the driving route based on the minimum sensor visibility requirements; and displaying an augmented reality (AR) visualization of the blind areas.

For some embodiments, determining whether minimum sensor visibility requirements are met may include: determining a percentage of minimum visibility areas covered by a field-of-view (FOV) of one or more sensors; and determining if the percentage exceeds a visibility area threshold.

For some embodiments, predicting blind areas along the driving route may include determining areas along the route where sensor visibility range is less than a minimum sensor visibility range requirement, and the minimum sensor visibility requirements may include the minimum sensor visibility range requirement.

Some embodiments of an apparatus may include: a processor; and a non-transitory computer-readable medium storing instructions that are operative, when executed by the processor, to perform one of the methods listed above.

Some embodiments of a method may include: predicting blind areas along a driving route of an autonomous vehicle (AV) based on expected limitations of sensors; and providing an indication of the predicted blind areas using augmented reality (AR) visualizations as the AV travels along the driving route.

While the methods and systems in accordance with some embodiments are discussed in the context of augmented reality (AR), some embodiments may be applied to mixed reality (MR)/virtual reality (VR) contexts as well.

BRIEF DESCRIPTION OF THE DRAWINGS

FIG. 17 is a flowchart illustrating an example process for predicting blind areas and displaying a visualization corresponding to the predicted blind areas according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

Example Networks for Implementation of the Embodiments

A wireless transmit/receive unit (WTRU) may be used as an autonomous vehicle (AV) or a wearable device (such as AR goggles) in some embodiments described herein.

Figure 1A:
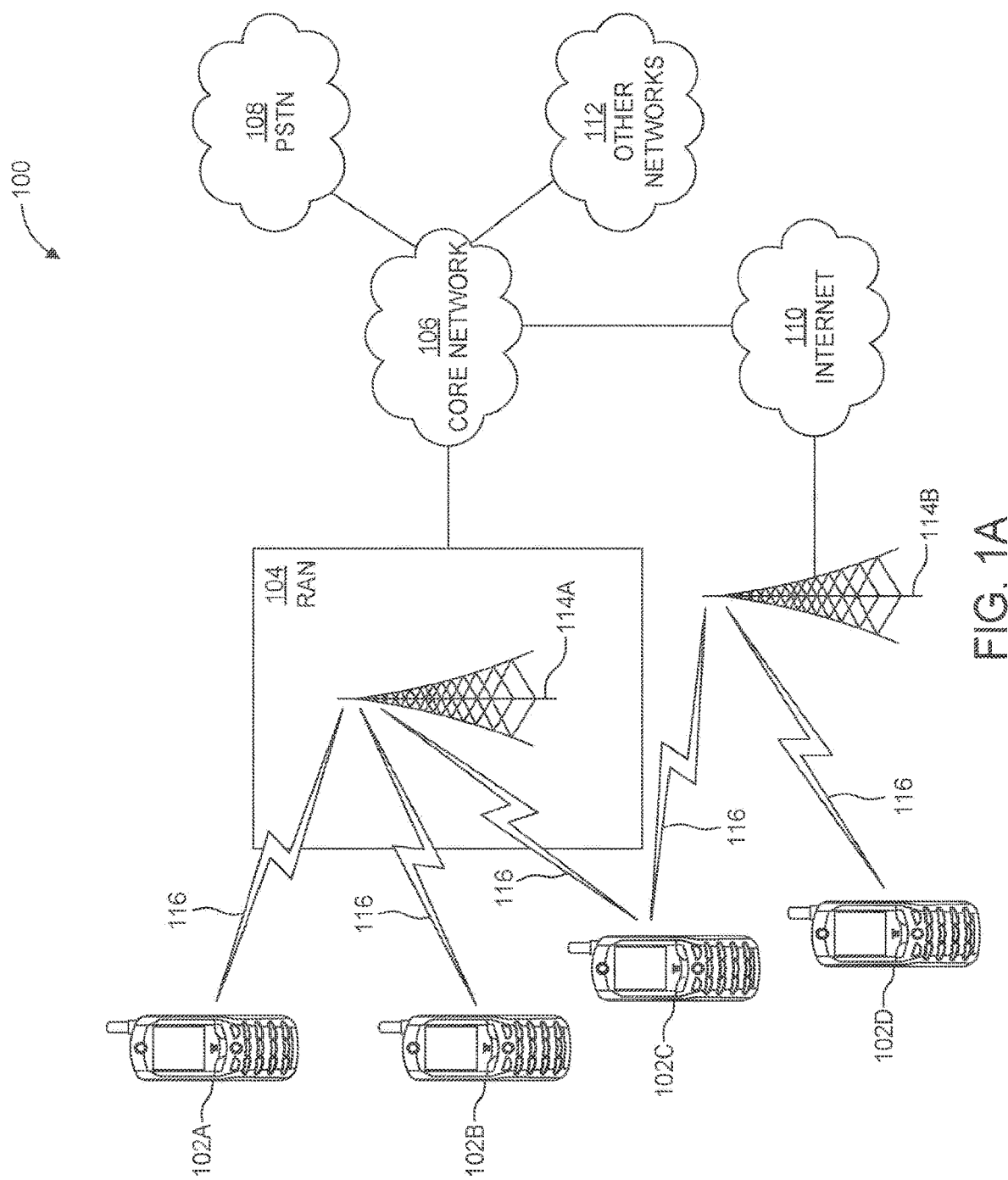
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi)), IEEE 802.11p (Dedicated Short Range Communications (DSRC)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (Qos) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WIFI radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
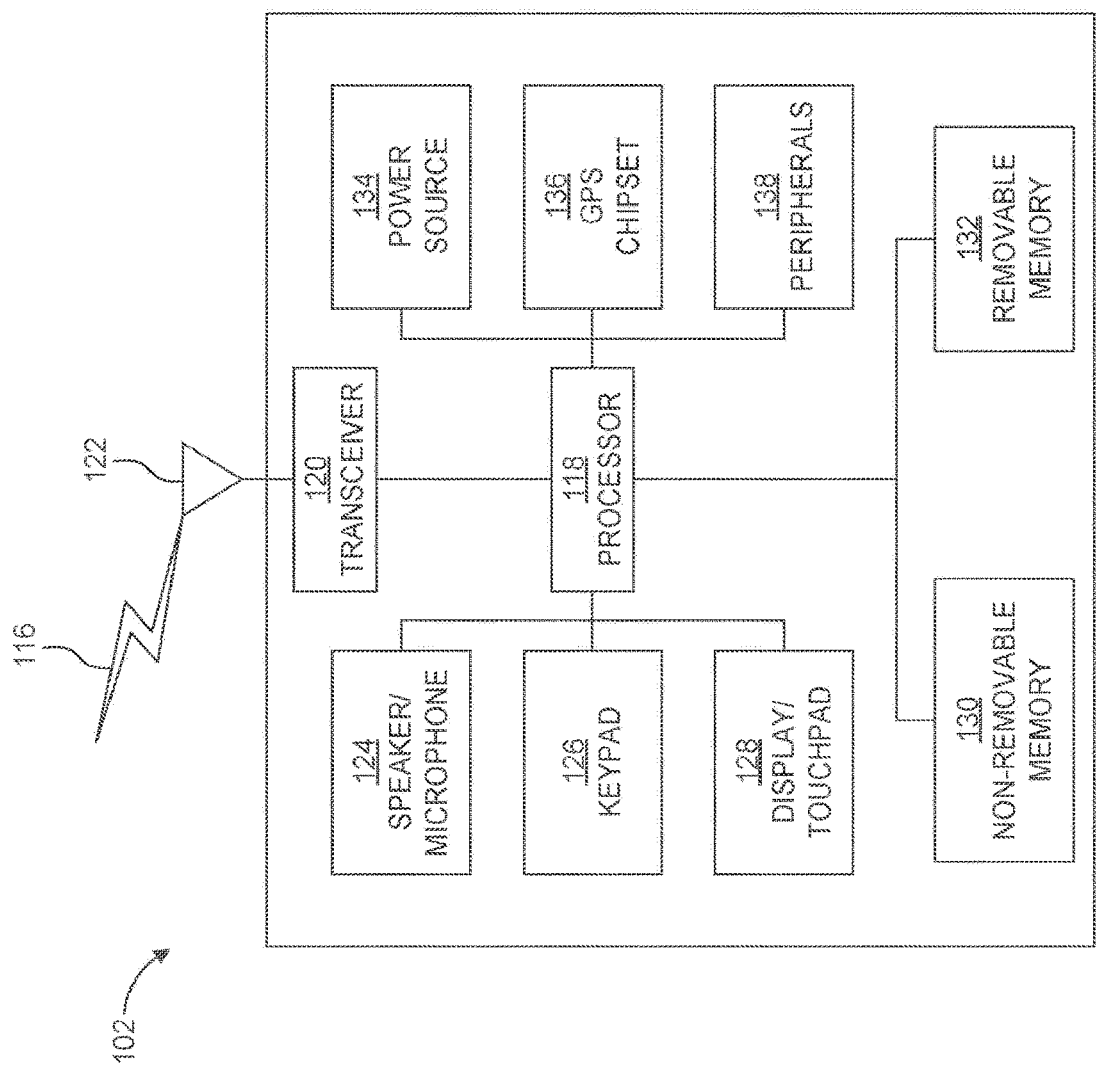
FIG. 1B is a system diagram of an example system illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a camera, a RADAR, a LIDAR, a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For some embodiments, an autonomous vehicle is, e.g., a vehicle that is capable, in at least mode of operation, of, e.g., sensing its environment and navigating without human input. Many such vehicles are being developed, but as of today, automated cars permitted on public roads are not yet fully autonomous. A partially autonomous vehicle, for example, may require a human driver at the wheel who, e.g., may have to monitor the automated driving and should be ready at a moment's notice to take control of the vehicle. Autonomous vehicles may use a variety of technologies to detect their surroundings, such as radar, lidar, GPS, odometry, computer vision, and inertial measurement units (IMUs). Control systems interpret sensory information to identify appropriate navigation paths, as well as obstacles and relevant signage.

Autonomous vehicles (which may include cars) generally may have control systems that are capable of analyzing sensory data to distinguish between different cars, motorcycles, bikes, and pedestrians on the road, which is very useful in planning a safe path to a desired destination. Modern self-driving cars may use Bayesian simultaneous localization and mapping (SLAM) algorithms, which fuse data from multiple sensors and an off-line map into current location estimates and map updates. SLAM may be combined with detection and tracking of other moving objects (DATMO), which handles the recognition of objects such as cars and pedestrians. Simpler systems may use roadside real-time locating system (RTLS) beacon systems to aid localization.

Among the potential benefits of autonomous cars is a significant reduction in traffic collisions, the resulting injuries, and related costs, including a lower need for insurance. According to some projections, autonomous cars may offer major increases in traffic flowrate; enhanced mobility for children, the elderly, disabled and poor people; relief of travelers from driving and navigation chores; lower fuel consumption; significantly reduced needs for parking space in cities; a reduction in crime; and the facilitation of different business models for mobility as a service, especially those involved in the sharing economy.

Vehicle sharing is a model of car rental where people rent cars for short periods of time, often by the hour. The organization renting the cars may be a commercial business or the users may be organized as a company, public agency, cooperative, or ad hoc grouping. Now, ride-sharing services enable a driver to use his or her own personal vehicle to provide transportation services as requested by a client. With the introduction of autonomous vehicles, the lines dividing the vehicle sharing and ride sharing business models may be diminished. Many challenges may emerge as new such markets are defined including safety concerns raised by potential consumers.

The potential obstacles to widespread adoption of autonomous vehicles may include, in addition to the technological challenges, disputes concerning liability; the time period needed to turn an existing stock of vehicles from non-autonomous to autonomous; resistance by individuals to forfeit control of their cars; consumer concern about the safety of driverless cars; implementation of legal framework(s) and establishment of government regulations for self-driving cars; risk of loss of privacy and security concerns, such as hackers or terrorism; concerns about the resulting loss of driving-related jobs in the road transport industry; and risk of increased suburbanization as driving is expected to become faster and less onerous without proper public policies in place to avoid more urban sprawl.

Advanced user interface technologies, such as augmented reality (AR) headsets and heads-up displays (HUDs), are becoming increasingly desirable for presenting relevant contextual data to people in real-world settings. For years, many luxury vehicles have been able to present speedometer information as a see-through projection onto the car's windshield. Motorcycle helmets that project GPS route information as a see-through image on the visor exist as well. These systems have the added benefit, in the context of vehicular operation, of being minimally intrusive to the user's engagement with the real-world environment.

Systems and methods described herein in accordance with some embodiments are provided for in-vehicle augmented reality (AR) visualization of sensor range and field-of-view. Disclosed herein are systems and methods in some embodiments that may predict blind areas that are along a driving route, display the blind areas to a driver (such as using a see-through heads-up display (HUD)), and alter a vehicle-operation mode (e.g., computer-assisted vs. manual) if needed. Some embodiments determine deficiencies in the effective range and viewing angles of vehicle sensors in traffic situations with respect to road angles, junctions, and fixed obstacles. Some embodiments of systems make these determinations based on predicted sensor range decreases (such as decreases due to weather conditions, lighting conditions, and equipment age). The deficiencies may be displayed to the driver or user (such as with user (or driver) head tracking and AR projection of the sensor range onto the road using AR goggles, an HUD, or an AR display mechanism). In a real driving environment, the driver may see areas or situations in which sensors may be unable to detect other traffic users/objects or may produce unreliable measurements to warrant automated driving, and an advanced driver-assistance systems (ADAS) may be engaged to assist the driver. For some embodiments, if a situation occurs in which vehicle sensors are measuring degraded measurements (which, e.g., may affect an ADAS), this situation may be communicated to the driver (such as by displaying a warning message and/or playing a sound, for example).

In some embodiments, a vehicle may use sensors to determine whether the vehicle may proceed cautiously into, e.g., a better viewing position and orientation without causing a traffic hazard. The driver may be provided with options for dealing with the situation, such as engaging manual driving mode, or proceeding in autonomous mode, with the driver prepared to stop the vehicle if needed. The determination of locations with potential sensor range and angle deficiencies may be done in advance to increase the time the driver has to prepare for the situation. Nearby vehicles may be informed of the intent of the vehicle (and driver) in a limited sensor visibility situation via vehicle-to-vehicle (V2V) messaging. Furthermore, nearby vehicles may communicate information to the vehicle (such as via V2V messaging), and the vehicle may output the information to the driver or user.

Disclosed herein in accordance with some embodiments are systems and methods for in-vehicle augmented reality (AR) visualization of sensor range and field-of-view (FoV). For some embodiments, an example process may include receiving driving route information, vehicle speed limits, and sensor capability data. The process further may include comparing static HD 3D map data with local dynamic map data from sensors. The process further may include determining minimum sensor visibility requirements (or whether minimum sensor visibility requirements are met) on the route. The process further may include computing predicted limited or no visibility areas. The process further may include displaying an augmented reality visualization of the limited or no visibility areas using an augmented reality projection device or system, such as, e.g., an in-vehicle projection system or a head-mounted projection unit.

The example systems disclosed herein in accordance with some embodiments may be embodied as an autonomous vehicle having, e.g., built-in AR projection equipment. Also, the system may be embodied in an AR display device. Examples of AR display devices popularly marketed today include Google Glass, Microsoft HoloLens, or Avegant Light Field. Furthermore, the example systems, in some embodiments, may be embodied as an autonomous vehicle in communication with a driver-worn AR display device.

To build the trust of drivers and riders towards autonomous vehicles (AVs), some embodiments may provide a mechanism by which passengers may understand a vehicle's capabilities. For example, object detection capabilities (including sensor ranges) may be displayed to passengers. Such sensor capabilities displayed may include safety warnings displayed to warn passengers of potential dangers (such as decreased effectiveness of vehicle sensors).

In-vehicle sensor systems for automated driving functions are complex systems which may be difficult for typical drivers to understand. Users may have questions concerning the effective range of the sensors, functional limits of the automated driving system, and what kinds of objects the sensors may detect. Manuals and brochures or guided videos may not be the best options for educating drivers on vehicle capabilities. Indeed, in the carsharing model, drivers are expected to feel comfortable getting into and operating a vehicle with which they may be unfamiliar. Furthermore, the range of a sensor for detecting objects (like pedestrians) depends on many factors.

For example, in some embodiments, a LIDAR sensor system and the corresponding algorithms may deliver tracked and classified object data online onboard a vehicle in real time. Objects may be classified, for example, based on their size, shape and absolute velocities. Classification of road users may include e.g., cars, trucks, bikes, motorcycles, and pedestrians as well as static objects. Typical detection ranges, for example, may be 150 m for vehicles or up to 50 m for pedestrians, although other ranges and distances may be used. Detection ranges may vary according to the size and reflectivity of the object and current environmental factors (e.g., humidity, rain, fog, snow, or hail, as just some examples). Also, the effectiveness of a sensor may be reduced greatly by road geometry and fixed obstacles, such as steep hills or sharp bends. For example, a commercial LIDAR may have only a very narrow vertical scanning angle, dramatically reducing its range in declining or inclining roads, especially when attached near ground level such as in a car's front grille. Thus, in certain conditions, a human operator may be able to see and judge a traffic situation better than the vehicle's sensors.

There are several visualization videos available from vehicle manufacturers and their suppliers that, e.g., demonstrate the point clouds of 360-degree LIDAR systems. However, many of these visualizations show the end result of sensor fusion from a highly sophisticated autonomous vehicle. Many vehicles may have significant limitations in their sensing ability, especially in certain directions. For example, a vehicle may be unable to image sideways much past the next lane, but forward-looking sensors may be sufficient for relatively-straight and flat roads.

Figure 2:
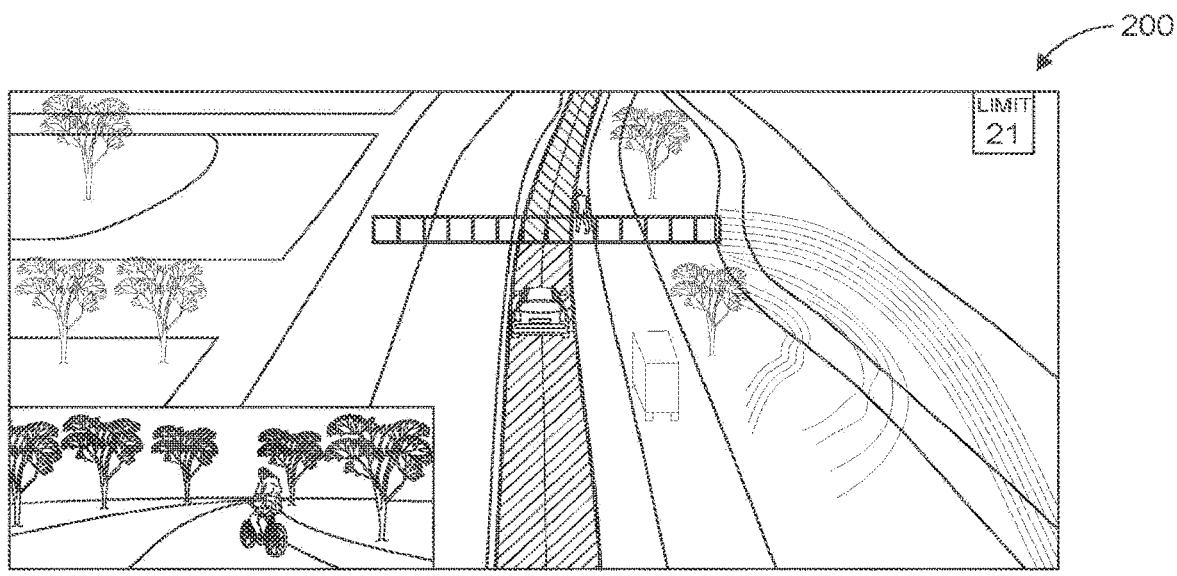
FIG. 2 is a picture illustration depicting an example illustration of an autonomous vehicle sensing a surrounding environment according to some embodiments.

FIG. 2 depicts an example illustration 200 of how an autonomous vehicle may sense the surrounding environment. In particular, FIG. 2 depicts a computer-vision view 200 illustrating an autonomous vehicle in a driving environment. The computer-vision view 200 further illustrates a predicted driving route, and various detected pedestrians and traffic signs. FIG. 2 shows a concept of the type of data an AV sensing system may generate in, e.g., good conditions.

It may be advantageous for people (as, e.g., drivers or even passengers) to have the capability to see, in a real-world coordinate system, what the vehicle sensor limits are in current driving conditions. Sensor setups (and therefore capabilities) may be dissimilar across different vehicle brands and models. Furthermore, older vehicles may have different sensors compared to newer vehicles. As vehicle sharing is growing fast, people may drive or ride in various vehicles during their daily life. It may generally be advantageous for people to know the capabilities of the vehicle as it is being operated.

A driver of an AV may benefit from, e.g., knowing if a vehicle's sensors are not able to properly observe a foreseeable traffic situation. In dangerous situations, for example, the driver may not know that the range or field-of-view may be reduced in one or several directions—or that range or FoV is reduced only for specific types of objects, such as (fast) approaching vehicles (which may include cars, trucks, and motorcycles, for example). Slower-approaching pedestrians may be detected with shorter detection distances.

For example, a vehicle in automated driving mode may approach a junction, and the vehicle may not be able to see the crossing traffic well enough to be able to proceed safely into the junction. This situation may force the driver to take full control of the vehicle, which may occur abruptly. Alternatively, the vehicle may be able to move safely into a position and orientation in which the vehicle is able to receive sufficient and timely information in the applicable directions. If the operator of the vehicle is informed of a specific blind area in the vehicle's sensor coverage, the operator may monitor that area and the vehicle may proceed through a hazardous section under supervised automated driving.

Even if the vehicle is in a manual driving mode, the driver may benefit from knowing that the vehicle's collision warning/prevention system is unable to detect potential hazards for certain regions with reduced sensor visibility. Systems and methods disclosed herein in accordance with some embodiments may visualize reduced sensor range and Field-Of-View (FoV) to the driver (or passenger) of the vehicle. The reduction may be triggered by sensor placement and the vehicle's orientation in a given traffic situation. For example, if driving on a sharp bend of the road, long range radar may point straight-forward (e.g., at a tangent into the woods or into the wall of a building) and not along the curve. The reduction may be triggered by present weather conditions limiting the optimal effectiveness of the sensors. Many factors may be used to determine physical locations in which sensors may have impaired visibility.

Augmented reality (AR) may be used to visualize digitally various features of the real world. AR headsets and glasses use optically transparent displays within the user's natural field of view. Wearing one of these devices may allow for the rendering of digital data over real-world views, such as if the driver turns his or her head. In the context of a vehicle, various transparent surfaces such as the front and rear windshields and the forward driver and passenger windows exist as latent AR projection surfaces. In fact, many vehicles already project driving data (e.g., speed, navigation instructions, etc.) onto the front windshield with a holographic AR effect. With the help of AR technology, an automated vehicle may provide users with more information regarding the capabilities of automated driving functions.

Figure 3:
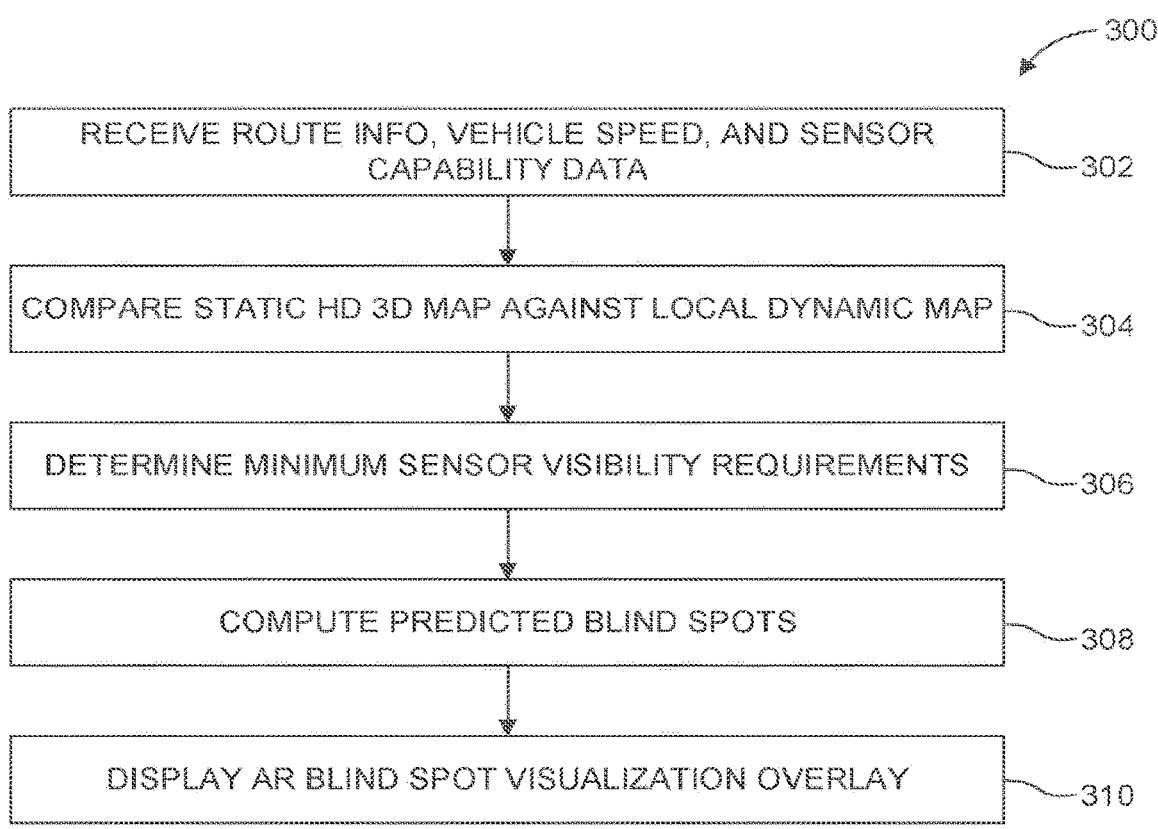
FIG. 3 is a flowchart illustrating an example process for in-vehicle augmented reality visualization of sensor range and field-of-view according to some embodiments.

FIG. 3 is a flowchart illustrating an example process for in-vehicle augmented reality visualization of sensor range and field-of-view according to some embodiments. In particular, FIG. 3 depicts a method 300 having processes 302-310. At process 302, the method 300 includes receiving driving route info, vehicle speed, and sensor capability data. At process 304, the process 300 further includes comparing static HD 3D map data with local dynamic map data from sensors. At process 306, the method 300 further includes determining minimum sensor visibility requirements (or, for some embodiments, whether minimum visibility requirements are met) on the route. At process 308, the method 300 further includes computing predicted limited or no visibility areas. At process 310, the method 300 further includes displaying an augmented reality visualization of the limited or no visibility areas using, e.g., an augmented reality projection device or system, such as, e.g., an in-vehicle projection system or a head-mounted projection unit.

Moreover, any of the embodiments, variations, and permutations described in the preceding paragraphs and anywhere else in this disclosure may be implemented with respect to any embodiments, including with respect to any method embodiments and with respect to any system embodiments.

Figure 4:
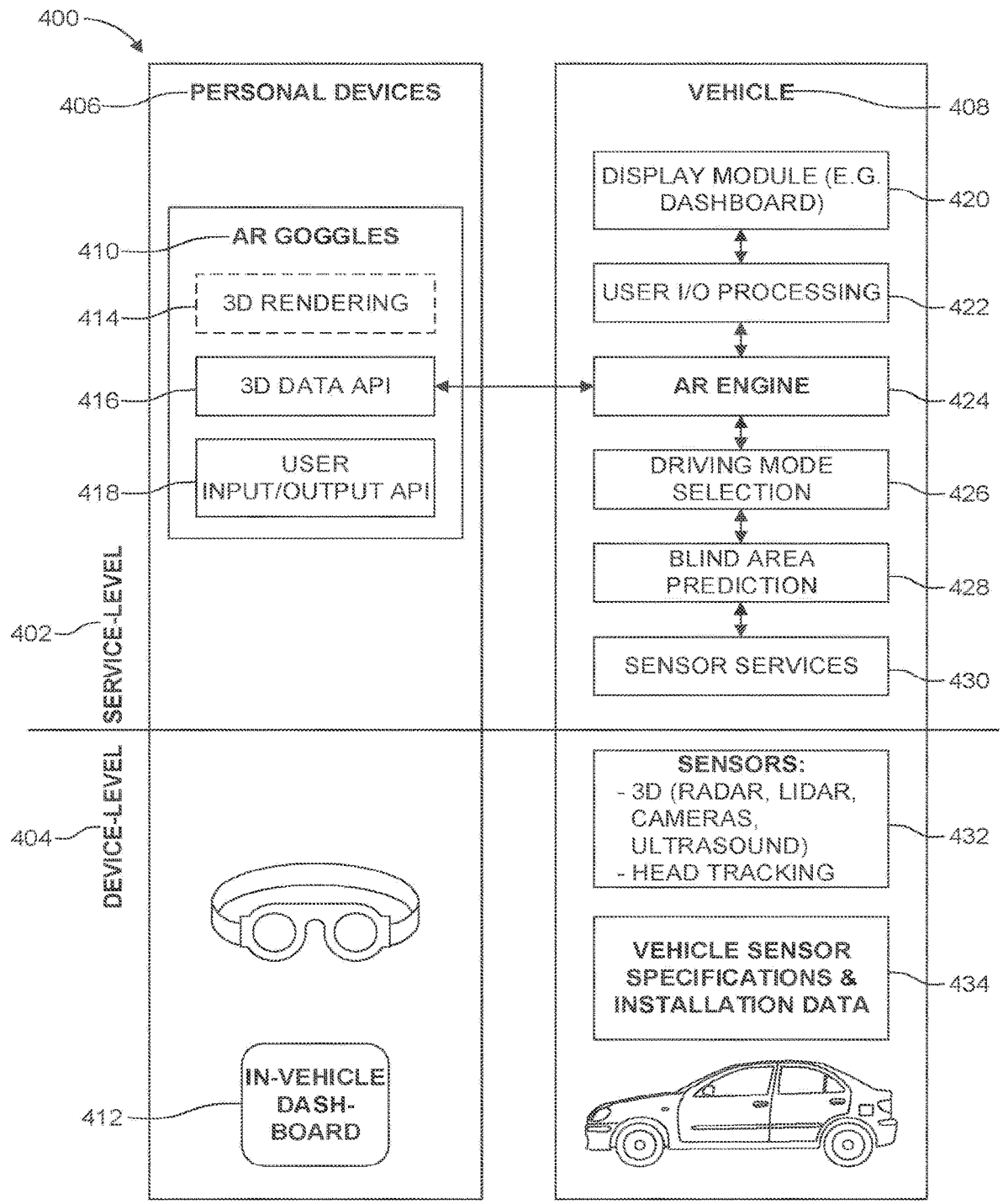
FIG. 4 is a system diagram illustrating an example set of interfaces for in-vehicle augmented reality visualization of sensor range and field-of-view according to some embodiments.

FIG. 4 depicts an example system architecture for in-vehicle augmented reality visualization of sensor range and field-of-view, in accordance with some embodiments. FIG. 4 depicts a system architecture 400 that includes personal devices 406 and a vehicle 408 that each may have respective device-level elements 404 and service-level elements 402.

The personal devices may include AR goggles 410 at the service level 402 and an in-vehicle dashboard 412 at the device-level 404. The in-vehicle dashboard 412 may display content on a center console. Furthermore, the system may project AR content onto the front and rear windshields and front windows by using an in-vehicle projection system or a head-mounted projection unit. The in-vehicle projection system may utilize in-vehicle driver head-tracking to align the AR projection data with the real-world. At the service-level 402, the AR goggles 410 may include a 3D rendering module 414, a 3D data API in communication with an AR engine 416, and a user input/output API 418.

The vehicle 408 may include a set of sensors 432 at the device-level 404. The sensors 432 may include 3D capture systems such as radar, lidar, ultrasound, and the like. Other sensors such as light field sensors and stereo imaging arrays could be employed as well. It should be understood that any of a vast array of sensors may be used within the scope of this disclosure. The device-level sensors also may include a head-tracking system for aligning AR content with a real-world coordinate system. Vehicle sensor specifications and installation data 434 may be included in the device-level 404 of the vehicle 408. The specifications and installation data 434 may be used to determine peak capabilities of the sensors 432 under ideal conditions. The performance of the sensors 432 may be measured in real-time and compared against the peak capabilities to identify potential hazard blind spot regions (or blind areas). The vehicle 408 further may include a set of service-level modules such as a display module (e.g., dashboard) 420, a user I/O processing module 422, an AR engine 424, a driving mode selector 426, a blind area prediction module 428, and sensor services 430.

For some embodiments, a process such as example process 300 of FIG. 3 may be implemented with a system architecture such as example system architecture 400 of FIG. 4. The example sequence diagrams 500 and 600 described with respect to FIGS. 5 and 6, as well as other example processes disclosed herein, may be implemented with, e.g., the example system architecture 400 of FIG. 4 for some embodiments.

Figure 5:
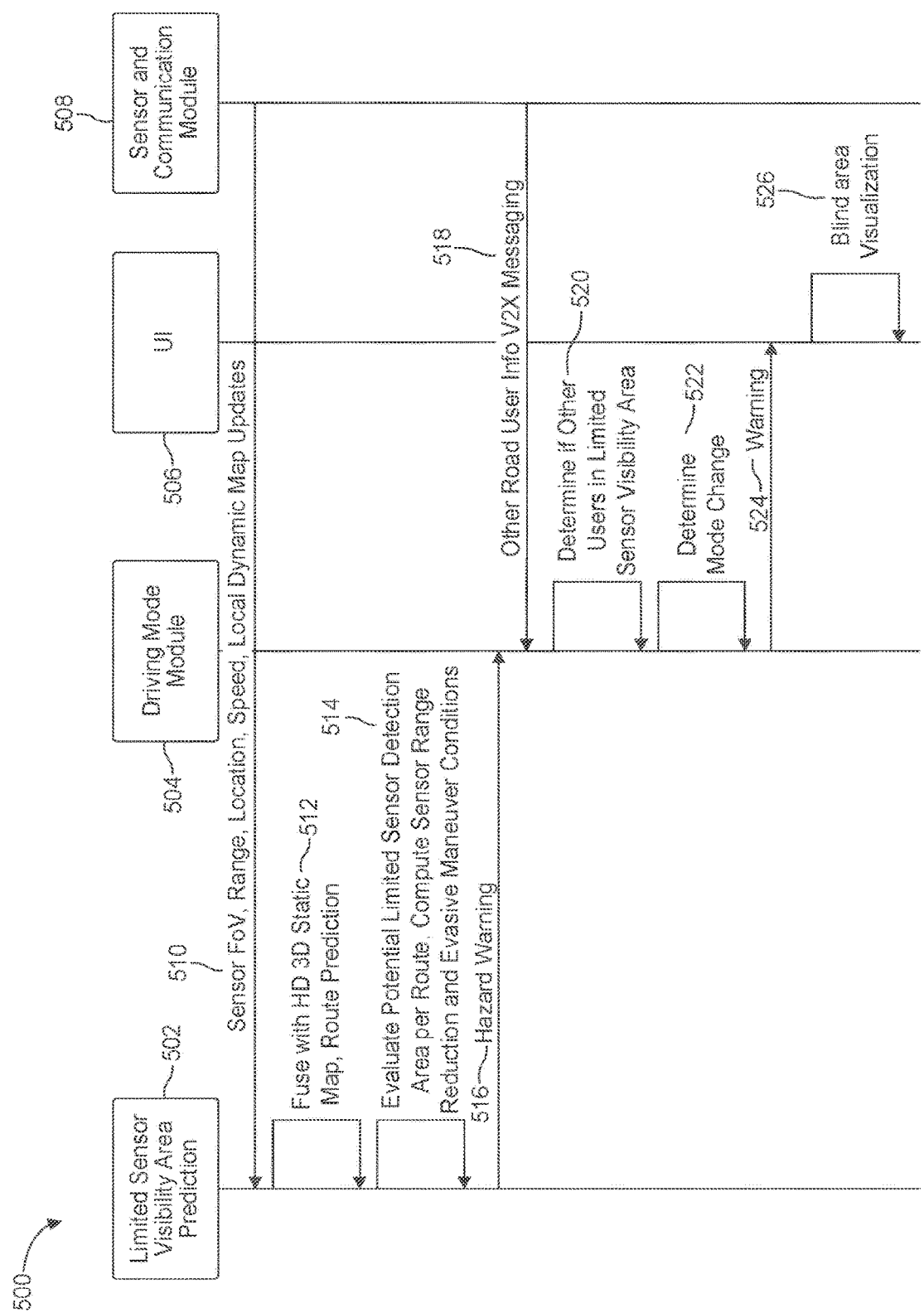
FIG. 5 is a message sequencing diagram illustrating an example process for a first example sequence diagram for in-vehicle augmented reality visualization of sensor range and field-of-view according to some embodiments.
Figure 6:
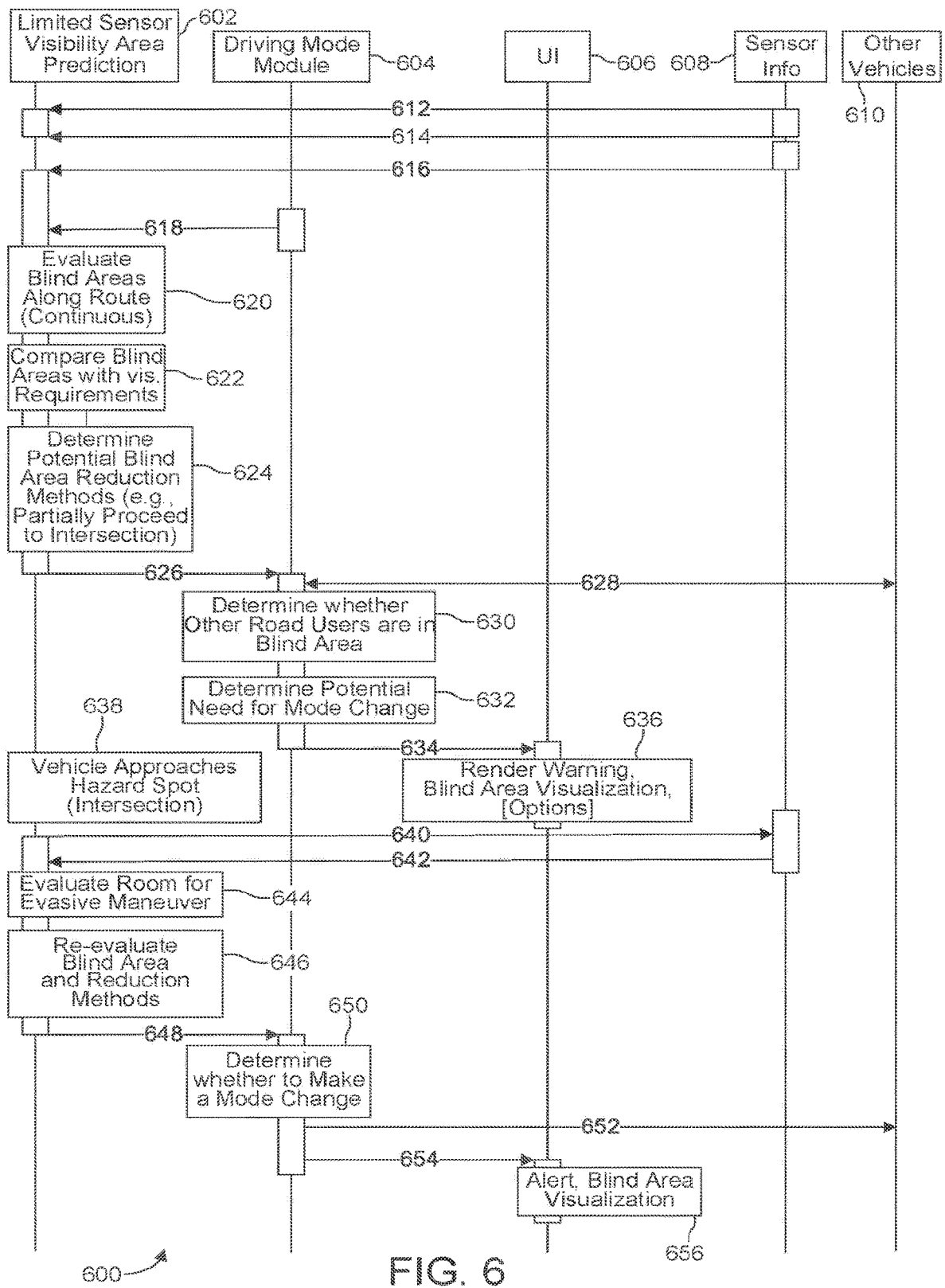
FIG. 6 is a message sequencing diagram illustrating an example process for a second example sequence diagram for in-vehicle augmented reality visualization of sensor range and field-of-view according to some embodiments.

The following descriptions of FIGS. 5 and 6 outline example processes described herein. FIGS. 5 and 6 depict example sequence diagrams for determining blind area(s) in the field of view (FoV) of a vehicle's sensors if approaching a road section with respect to the intended maneuver through the road section, determining whether the blind area(s) may affect the intended maneuver, and if so, drawing the driver's attention to the affecting blind area(s) and providing options for negotiating the road section.

FIG. 5 depicts a first example sequence diagram 500 for in-vehicle augmented reality visualization of sensor range and field-of-view, in accordance with some embodiments. FIG. 5 depicts a first sequence diagram 500 that outlines a functional workflow across four modules: a limited sensor visibility area prediction module 502, a driving mode module 504, a UI module 506, and a sensor and communication module 508. The sensor and communication module 508 may send 510 data comprising a present sensor field-of-view, effective range, vehicle location, vehicle speed, and any local dynamic map updates to the limited sensor visibility area module 502.

The limited sensor visibility area prediction module 502 may determine regions of the real-world where, e.g., the sensors may not have an effective reading. The limited sensor visibility area prediction module 502 may fuse 512 and orient the data received from the sensor and communication module 508 with a high definition 3D static map of the present environment. The limited sensor visibility area prediction module 502 may perform 512 route prediction based on the navigation settings and real-time sensor data. The limited sensor visibility area prediction module 502 evaluates 514 potential limited sensor detection areas according to the vehicle's present position and predicted route. Furthermore, the limited sensor visibility prediction area module 502 computes a level of reduction of effective sensor range due to e.g., road geometry, sensor placement, and other visibility factors like the weather and lighting conditions.

If regions of limited sensor visibility are detected the limited sensor visibility area prediction module 502 sends 516 a hazard warning to the driving mode module. In some embodiments, the driving mode module 504 may receive 518 vehicle-to-vehicle (V2V) messages from another nearby vehicle or from a sensor and communication module 508. The messages may include information about another vehicle such as its location, speed, driving direction, and any planned courses of action. The driving mode module 504 may receive the V2V message along with a hazard warning indicating the areas of potentially limited sensor capabilities and may determine 520 if other drivers are likely in a limited sensor visibility area. The driving mode module 504 may determine 522 a change to an operable driving mode. The UI module 506 may receive 524 a warning from the driving mode module 504 and may execute 526 a blind area AR visualization. Various examples of AR visualizations of blind areas and user prompts are presented in the descriptions of FIGS. 13A, 13B, 14, 15, and 16.

In some embodiments, a driver may be prompted to select an assisted or manual driving mode in response to detected potential blind areas. A default driving mode (e.g., one which requires a least amount of human-intervention) is selected if a user is prompted to select a driving mode and does not respond in a threshold amount of time. In some embodiments, the AV comes to a full stop instead of, e.g., proceeding along the route, and the driver selects a driving mode and indicates via the UI module that the driver is alert and focused on traffic conditions.

FIG. 6 depicts a second example sequence diagram 600 for in-vehicle augmented reality visualization of sensor range and field-of-view, in accordance with at least one embodiment. In particular, FIG. 6 depicts an extended sequence diagram 600 having four functional modules 602, 604, 606, 608 that are analogous to the modules of the first sequence diagram 500 of FIG. 5. The sequence diagram 600 includes a limited sensor visibility area prediction module 602, a driving mode module 604, a UI module 606, and a sensor information module 608.

The sensor information module 608 may send 612 sensor ranges and FoV data to the limited sensor visibility area prediction module 602 (which for some embodiments may be a blind area prediction module). The sensor information module 608 also may send 614 static 3D high definition map data to the blind area prediction module. Furthermore, the sensor information module 608 may send 616 location information and local dynamic map updates to the blind area prediction module.

The driving mode module 604 may send 618 information indicating a predicted vehicle route as well as sensor visibility requirements for the currently selected driving mode to the blind area prediction module.

The limited sensor visibility area prediction module 602 may continually evaluate 620 blind areas along the route. The evaluation may take into account a real-time stream of sensor data from the sensor information module 608 and the evaluation may be carried out continually in order to keep the blind area prediction up to date. The limited sensor visibility area prediction module 602 may compare 622 the predicted blind areas with the received visibility requirements for the current driving mode. Based on the comparison, the limited sensor visibility area prediction module 602 may determine 624 potential blind area reduction methods such as repositioning the vehicle by partially pulling into an intersection, thereby moving the FoV of various sensors into the potential blind area. Other methods for reducing potential blind areas may include adjusting dynamic sensor orientations and settings. The limited sensor visibility area prediction module 602 may send 626 a hazard warning to the driving mode module 604 indicating potential blind areas and suggested methods for reducing the potential blind areas.

Figure 15:
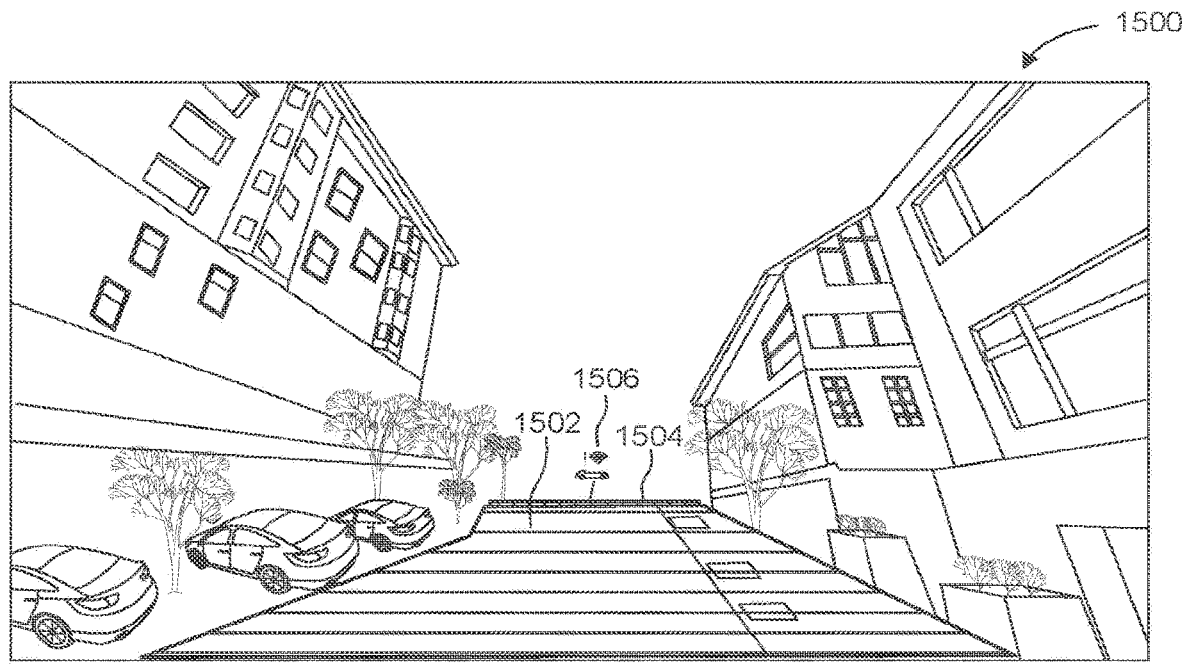
FIG. 15 is a schematic perspective view illustrating an example AR visualization of sensor range, field-of-view, and a warning of another vehicle according to some embodiments.
Figure 16:
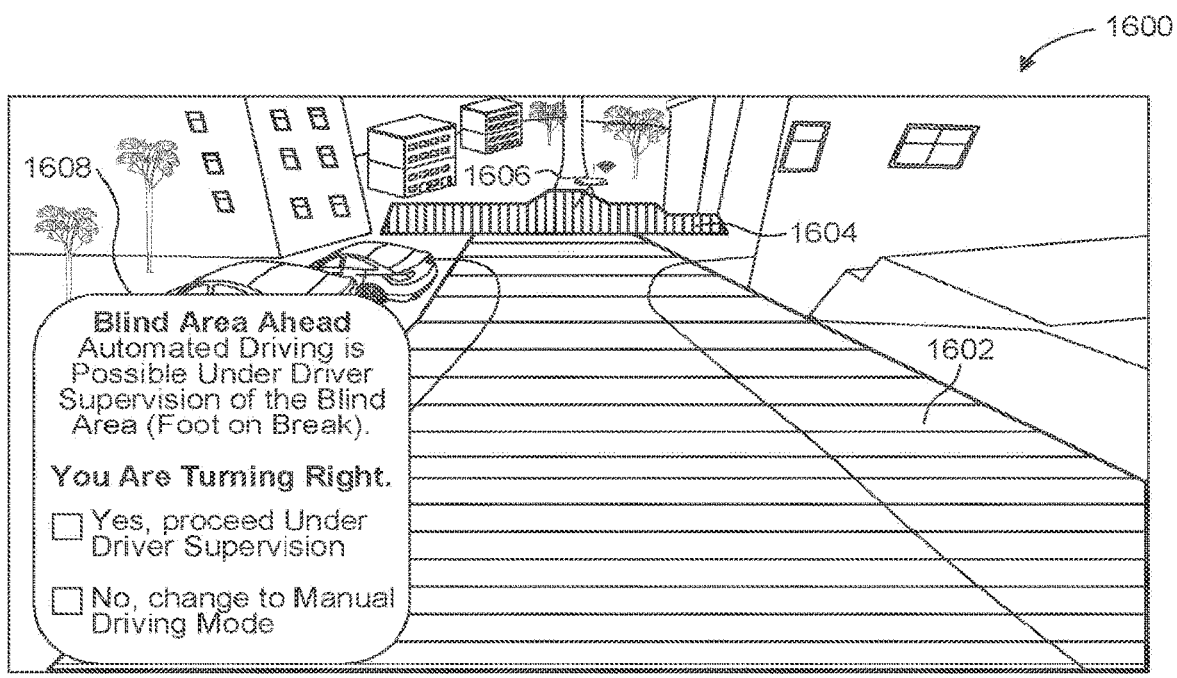
FIG. 16 is a schematic perspective view illustrating an example AR visualization of sensor range, field-of-view, and a prompt to select a driving mode according to some embodiments.

The driving mode module 604 may receive 628 information regarding other road user information via V2V messaging (which may include location, speed, acceleration, and intent). The information regarding, e.g., other road users may be communicated using any wireless communication technology, such as, e.g., one that meets data throughput and latency demands. The information includes a nearby vehicle location, speed, acceleration, and driving-route intent. The driving mode module 604 may use at least a portion of this information to determine 630 whether other vehicles are in a predicted blind area and to determine 632 if a potential mode may be changed. The driving mode module 604 may responsively send 634 a mode change warning, blind area information, and other vehicle information to the UI module 606 and trigger the rendering of a vehicle hazard icon via the AR projection device or system, such as, e.g., an in-vehicle projection system or a head-mounted projection unit (some example AR projections are shown in FIGS. 15 and 16). The driving mode module 604 may send 634 a mode change warning (prompt), blind area information, and other vehicle information (e.g., an up-to-date position and orientation) to the UI module 606. The UI module 606 may render 636 blind area visualizations and a mode change prompt so that they may be displayed via the AR projection system or device (e.g., the driver's AR glasses or a vehicle's in-built AR projection system).

The AV may approach 638 a potential hazard spot (e.g., an intersection). The limited sensor visibility area prediction module 602 may send 640 a sensor modification request (including monitor future driving direction) to the sensor information module 608. The sensor modification request directs the sensor system to monitor the environment in a future driving direction (as indicated by the predicted vehicle route trajectory). The sensor information module 608 may send 642 location information and local dynamic map updates to the limited sensor visibility area prediction module 602. The limited sensor visibility area prediction module 602 may evaluate 644 the environment to identify regions that may be used to take evasive action. The evaluation may be performed in view of the predicted blind area's location relative to the AV and its trajectory, so that the AV may create a course of action to handle scenarios in which objects suddenly come into the sensor's FoV from the predicted blind area. The limited sensor visibility area prediction module 602 may re-evaluate 646 the sensor data to generate updated predicted blind areas and updated blind area reduction methods. The limited sensor visibility area prediction module 602 may send 648 a hazard warning as appropriate to the driving mode module 604.

The driving mode module 604 may determine 650 whether to make a mode change, which may be based on driver feedback to a prompt. A hazard warning may be sent from the driving mode module 604 using, e.g., V2V communication protocols to other nearby vehicles. This V2V message indicates the AV's detected blind areas and any intended driving action. A hazard warning to other road users (V2X), intended action, and blind areas may be sent 652 from a driving mode module 604 to other vehicles 610 and to other users (V2X). The driving mode module 604 may determine 650 a driving mode change and may send 654 an indication of such driving mode change and blind area information to the UI module 606 so that the blind area information may be rendered using an AR system. The UI module 606 may display 656 mode change prompts, mode change notifications, and blind area information.

It should be noted that FIGS. 5 and 6 are instructive examples, and the order in which many of the elements take place may be altered as would be understood by one with skill in the relevant art. Additionally, functional steps may take place in modules other than ones listed above, and data/commands may be sent and received via other modules as well. For example, the UI module may receive blind area information from a blind area prediction module or a driving mode module. The various modules show a conceptual organization for the systems and processes described herein, but the scope of their functions is not meant to be limiting in any way.

Figure 7:
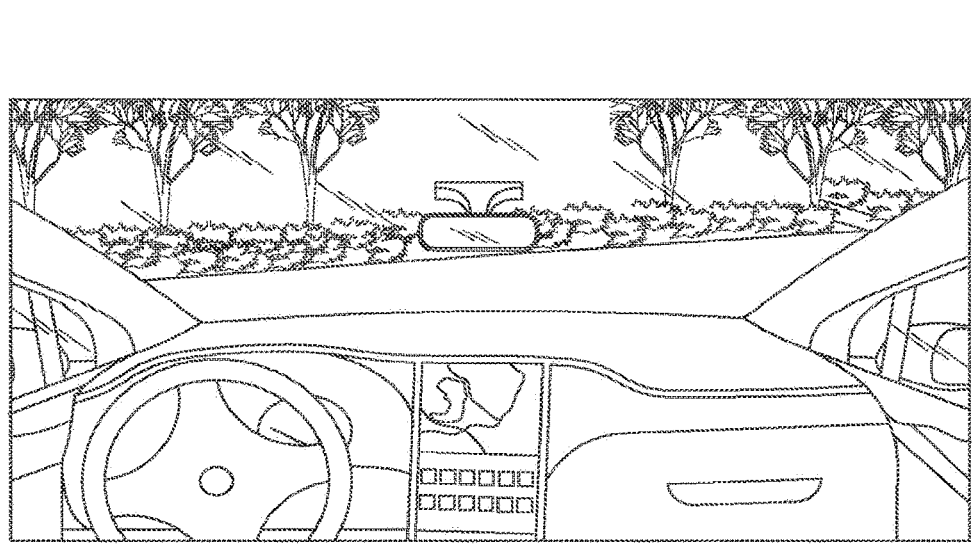
FIG. 7 is a picture showing an example of a driver's view at a turning point according to some embodiments.
Figure 8:
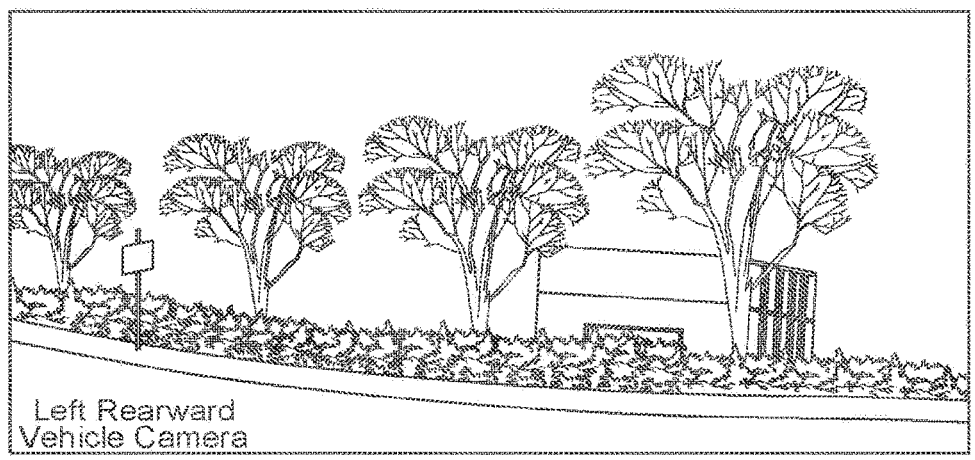
FIG. 8 is a picture showing an example of a left-rear camera view at the turning point according to some embodiments.
Figure 9:
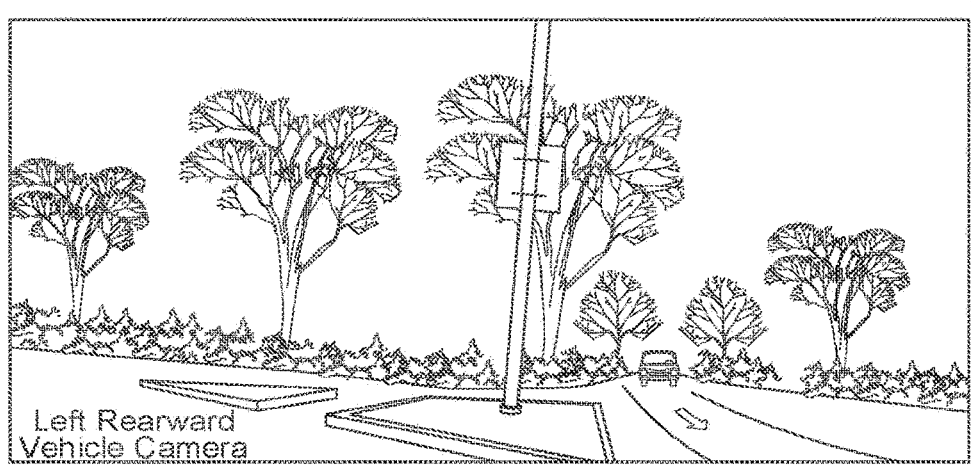
FIG. 9 is a picture showing an example of a left-rear camera view as a vehicle begins a turn according to some embodiments.

FIGS. 7-9 depict various viewpoints at two times in a real-world driving scenario. FIGS. 7 and 8 are depictions of two different viewpoints taken at the same point in time. FIG. 9 is a depiction of the same viewpoint in FIG. 8 at a later point in time.

FIG. 7 depicts an example driver's view at a turning point. In particular, FIG. 7 depicts an example driver's view 700. The driver's view 700 illustrates the inside cabin of an AV and the external environment as seen through the front windscreen and windows. For the example of FIG. 7, the AV is at a "T" intersection, and the AV is in the process of turning right. The turn angle of the depicted intersection is about 90 degrees.

FIG. 8 depicts an example left-rear camera view at a turning point. In particular, FIG. 8 depicts an example rear-camera view 800. The rear-camera view 800 illustrates that the FoV of the rear-camera does not include the road onto which the AV is turning. A potential blind area determined by the AV may be reduced. The AV may determine that a safe course of action is to pull into the intersection and begin the turn, thereby re-orienting the AV sensors.

FIG. 9 depicts an example left-rear camera view as the AV begins a turn. In particular, FIG. 9 depicts an example rear-camera view 900. The rear-camera view 900 illustrates that the FoV of the rear-camera now includes the road that the AV is turning onto. As shown in the rear-camera view 900, a nearby car is driving towards the AV on the succeeding road in the same direction of traffic (potentially at a high speed). This maneuver may be dangerous if both the driver and the sensors do not observe the oncoming vehicle. In example embodiments, sensor settings may be adjusted at this time to better analyze the new viewpoint. In some embodiments, the system may evaluate the surrounding environment to identify regions that may be used to take evasive action. This evaluation may include detecting pedestrians on the sidewalk and/or bikers off to the side in a bike lane so that they may be avoided.

The examples of FIGS. 7-9 do not illustrate AR visualizations of potential blind areas. Instead, these illustrations are included to show a driving situation in which an AV enters a potentially hazardous location before its sensors may sweep a sufficient FoV. In such a scenario, an AR visualization of a predicted blind spot may help alert the driver to AV sensor limitations based on road geometry and may direct driver focus towards regions with potential hazards.

Figure 10:
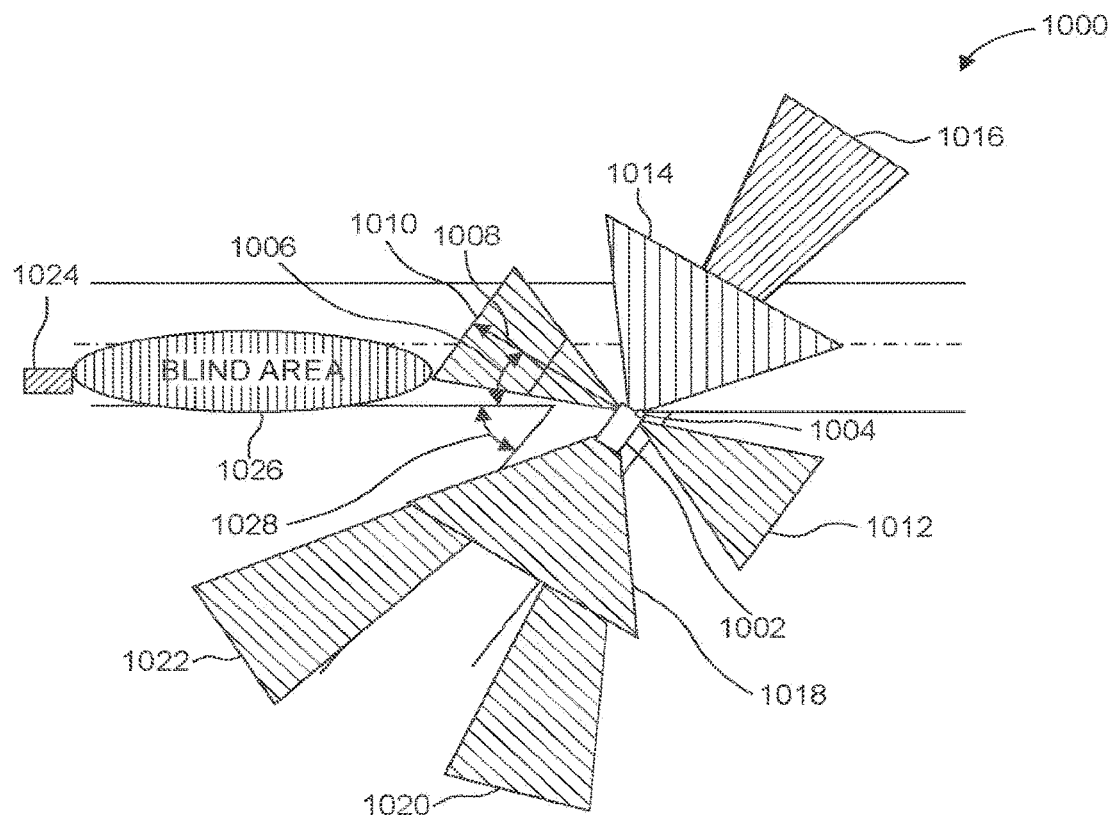
FIG. 10 is a schematic plan view illustrating an example set of factors that may influence prediction of blind areas according to some embodiments.

FIG. 10 depicts example factors that may influence the prediction of blind areas, in accordance with some embodiments. FIG. 10 depicts a plan view 1000 of an autonomous vehicle 1002 at a turn point 1004 equipped with an apparatus disclosed herein. The AV determines potential blind areas 1026 in the foreseeable path of the vehicle 1002 up to a predefined time (e.g., 10 seconds). The path may be taken from a current navigation route and/or by predicting where the vehicle 1002 may go, based on the road traffic conditions (such as another vehicle 1024 traveling along a route), map, and other sources such as driving history and vehicle speed. Blind area prediction may include calculating what the sensors may detect (e.g., by simulating visibility using an HD 3D map or by simulating a FOV 1010, 1012, 1014, 1016, 1018, 1020, 1022 for each sensor, which may include a sensor FOV angle 1006 and a sensor direction and range 1008) as the AV 1002 moves along a route, through a turn (with an intersection/turn angle 1028) at an intersection. This simulation may yield a map indicating potentially blind areas 1026 for each detectable object type, at each point along a predicted (or an anticipated) route. In some embodiments, the map may be a partition map, wherein each region corresponds to a potential hazard score. For some embodiments, the map may be a heat map indicating which regions are more likely to be blind areas.

For some example embodiments, an AV may continually update a prediction of foreseeable obstacles, road curvature, and other features of an environment that may affect a sensors' ability to collect data in select road sections such as sharp bends, hills, and intersections. Areas where the sensors are unable to perform detection to their full FOV and range (determined by, e.g., manufacturer specifications, or some dynamic techniques) may be flagged as blind areas. Reasons for blind areas may be, e.g., vegetation, buildings, or road orientation. For example, an AV's front-facing sensors may cover a long distance whereas side-facing sensors may not. Thus, the ability to detect crossing traffic in an intersection may be reduced (as shown by FIGS. 7-9). Furthermore, visibility in roads and intersections may be designed with a human observer in mind. Vehicle sensors may be placed significantly lower than human eyes (e.g., in a vehicle's front grille). Thus, a vehicle may have limited sensing ability in places where a human may see without a problem. This may be true if navigating uneven terrain with steep grades. Lighting conditions and weather, such as fog and rain, may have an effect on a vehicle's ability to observe various objects. Accommodations for these conditions may use an approximation of the effects of weather and lighting on sensors. An approximation method may use a lookup table of sensor effectiveness versus prevailing conditions. A lookup table may be specified by a manufacturer or another source, such as a crowd-sourcing service.

For some embodiments, blind area prediction may be done by simulating a vehicle's movements and resulting sensor visibilities along a predicted route within a virtual world (e.g., within an HD 3D map). The HD 3D map may include data which allows sensor efficacy analyses to be performed at a plurality of vehicle positions, speeds, and orientations. For some embodiments, a vehicle may determine a maximum route distance to scan, based on a current speed and predefined time (e.g., at 36 MPH and 10 s of elapsed time, a vehicle may traverse a distance of 176 yards).

For some embodiments, a vehicle executes an iterative analysis that simulates the AV at consecutive locations along the predicted route. This analysis may be used to determine a turn point (a point at which the vehicle starts to make a turn and inch forward to the other lane). For some embodiments, at each step, an analysis may calculate areas that are viewable by a vehicle's sensors at that location and orientation, using an HD 3D map, and recorded locations, orientations, FoVs, and ranges of the vehicle's sensors. FIG. 10 shows one example of a visualization of a single step of such an analysis. For some embodiments, at each step, viewable areas may be calculated for one or more object types that the sensors are able to recognize. The calculation may take into account the current lighting and weather conditions, e.g., by referencing a manufacturer specified look-up table indicating lab-measured sensor performance in various conditions. Specifically, for determining blind areas at a turning point, the following pseudocode method may be used:

To calculate the above threshold, the system may use road and lane widths (e.g., by using the sensors and/or HD 3D map) and the number and layout of lanes (such as vehicle, pedestrian, and bicycle configurations). For some embodiments, a threshold may be determined by assuming that a maximum of two vehicles may fit safely on the road side-by-side. For some embodiments, the threshold may equal the road width (e.g., two times an average (or typical) vehicle width).

For some embodiments, an AV may compare calculated areas from a simulation with the vehicle's sensor ranges and FoVs. Regions that lie between the calculated areas and the range and FoV of the sensors may be marked as blind areas. A suitable rendering technique may be used to indicate potential blind areas, such as ray-tracing.

If an AV reaches a turn point, a blind area prediction module may instruct a sensor system to modify its sensing and reporting parameters to enable the monitoring of nearby and oncoming traffic. For instance, the modification of sensing parameters may include an activation of sensors that are not currently active, such as a long-range radar. Modifications to reporting parameters may include instructions to report every pedestrian on the same side of the street as a high-risk object because the vehicle may have to use the side of the road for evasion, or to report oncoming vehicles as potential hazards (e.g., to ensure that a vehicle from the blind area will have room to maneuver). Neither maneuver occurs in a typical (or normal) driving situation if oncoming vehicles and pedestrians remain in their designated areas.

Figure 11:
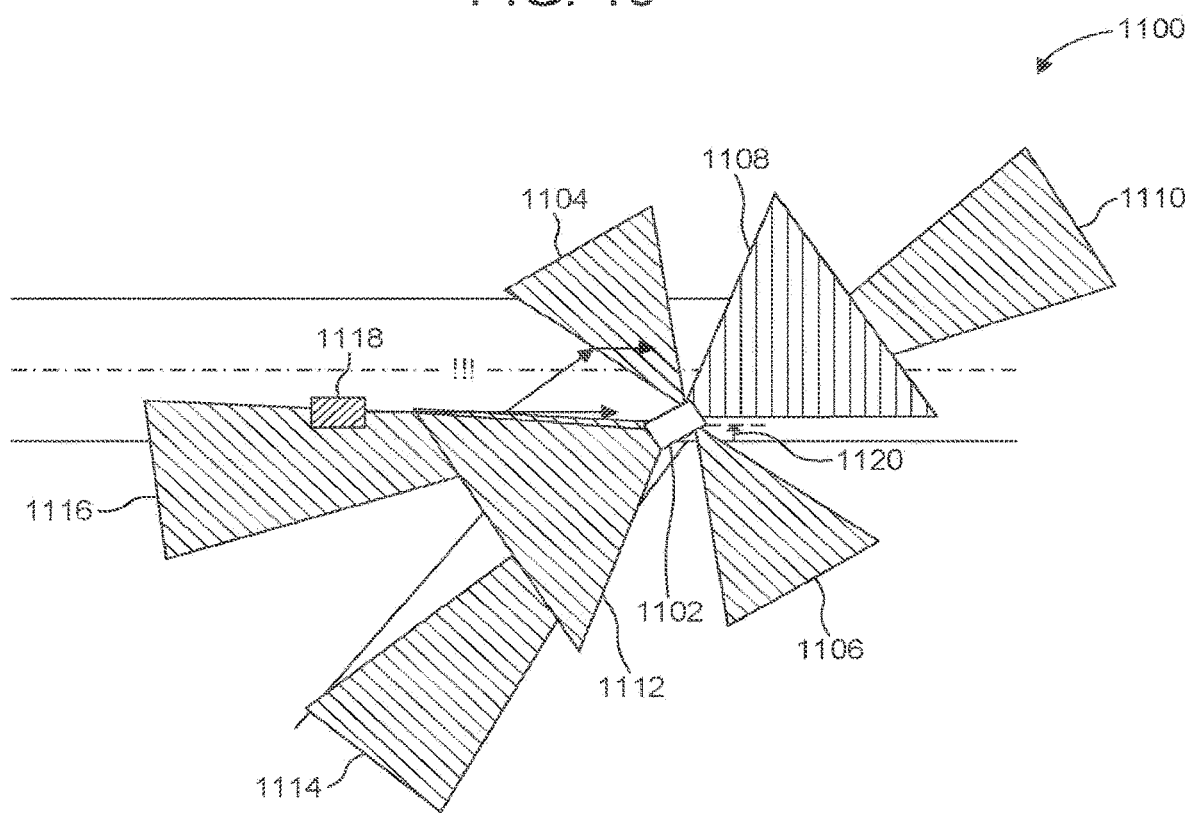
FIG. 11 is a schematic plan view illustrating an example prediction of blind areas based on a simulated future vehicle location according to some embodiments.

FIG. 11 depicts an example prediction of blind areas for a simulated future vehicle location, in accordance with some embodiments. FIG. 11 is an illustration 1100 of a pre-calculated situation (which was simulated during the blind area prediction sub-process) in which a vehicle 1102 traverses a proceed distance 1120 that is too far into the other lane before the vehicle 1102 is able to see (e.g., via sensor FOVs 1104, 1106, 1108, 1110, 1112, 1114, 1116) another vehicle 1118 coming from the left. This scenario may be flagged as a potentially dangerous situation.

Figure 12C:
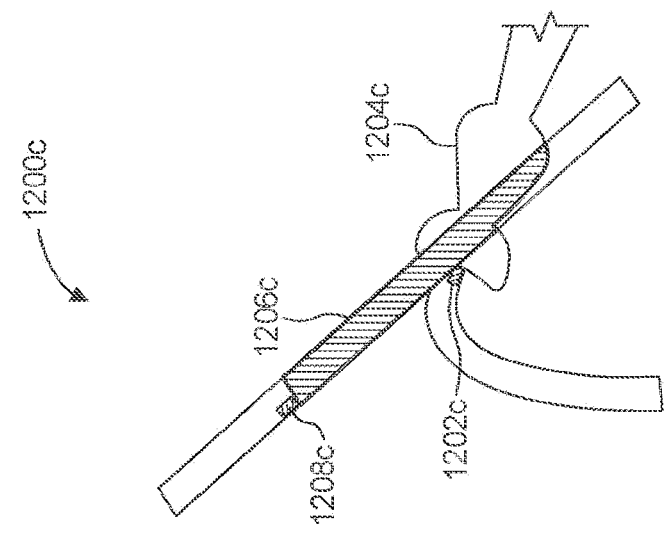
FIGS. 12A-12C are schematic plan views illustrating an example scenario in which blind area prediction takes place over a period of time according to some embodiments.
Figure 12B:
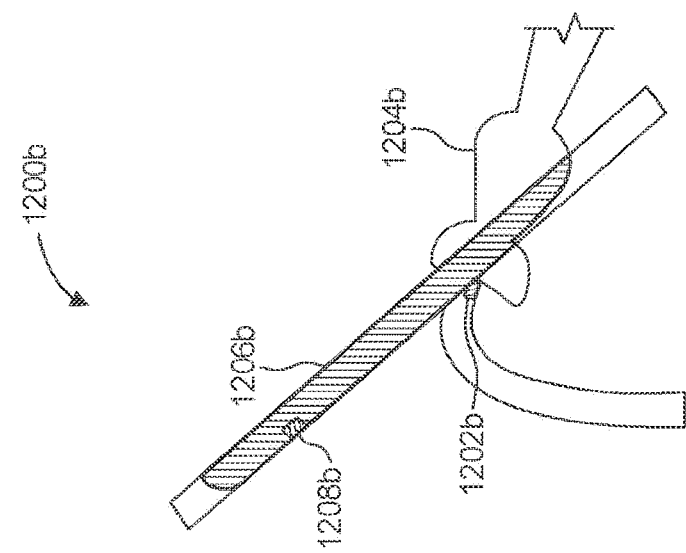
Figure 12A:
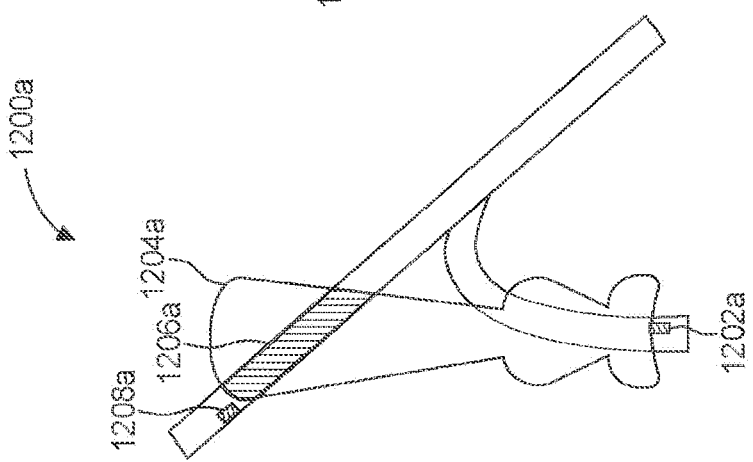

FIGS. 12A-12C together illustrate an example scenario in which blind area prediction takes place over a period of time, in accordance with some embodiments. FIG. 12A depicts a top-down view 1200a comprising an AV 1202a, a FoV 1204a, a scanned area 1206a, and a vehicle 1208a. FIG. 12B depicts a top-down view 1200b comprising an AV 1202b, a FoV 1204b, a scanned area 1206b, and a vehicle 1208b. FIG. 12C depicts a top-down view 1200c comprising an AV 1202c, a FoV 1204c, a scanned area 1206c, and a vehicle 1208c. The top-down views 1200a-c represent the AV 1202 at successive moments in time and indicate various regions of interest. 1200a shows the furthest point on the road the AV 1202a may see when approaching the intersection. Another vehicle 1208a is just outside the sensed area 1204a. 1200b shows a scanned section 1206b when the AV 1202b reaches the intersection. The other vehicle 1208b is in the scanned section 1206b, without the AV 1202b detecting

```
Find (Proceed_Distance_From_Turn_Point)    // Vehicle proceeds step-by-step to other lane & turns
    Until Rear Corner Camera View Covers Lane on Crossing Road
End
If (Proceed_Distance > Threshold)           // Determine if AV may have gone too far into other lane
                                            // Threshold may be calculated, e.g., from ratio between
                                            //   road and lane width
    Potential_Hazard_Blind_Area = True      // AV has proceeded too far before AV is able to see
End
``` the other vehicle 1208*b*. In FIG. 12C's view 1200*c*, a blind area is enlarged (see reduced scanned section 1206*c*) to compensate for the time elapsed between FIG. 12A's scenario 1200*a* to FIG. 12B's scenario 1200*b*. The blind area may be projected based on a speed limit on the crossing road. Thus, the AV 1202*c* may operate under an assumption that there may be a vehicle in the blind area.

In some embodiments, the area that the sensors see is accumulated over time, in which case the predicted blind areas may also be dependent on time. FIGS. 12A-12C illustrate this concept. In FIG. 12A, the AV 1202*a* is approaching an intersection, and the AV 1202*a* receives a clear view of the crossing road. With an unobstructed view, the AV's FoV 1204*a* senses a scanned region 1206*a* that is part of the crossing road. As the AV 1202*b* drives on, as depicted in FIG. 12B, the sensors of the AV 1202*b* effectively sweep a contiguous section region 1206*b* of the crossing road. In FIG. 12C, the AV 1202*c* has compensated for the time elapsed between measurement (shown in the scenario 1200*a* of FIG. 12A) to the current time (shown in scenario 1200*b* of FIG. 12B and scenario 1200*c* of FIG. 12C) by marking a part of the sensed area as blind (the difference between FIG. 12B's scanned area 1206*b* and FIG. 12C's scanned area 1206*c*), according to the elapsed time and the speed limit on the crossing road. The elapsed time and the speed limit may be combined to determine the distance the second vehicle 1208*a*, 1208*b*, 1208*c* may travel between the scenario 1200*a* of FIG. 12A and the scenarios 1200*b*, 1200*c* of FIGS. 12B and 12C. The amount by which the blind area is increased also may be multiplied by a safety factor that may be dependent on the speed limit, weather, and ambient light level, for example.

Time-based blind area estimation may also include prediction of the movement of objects that may be partly hidden during the sweep. For example, if some portions of FIG. 12B's scanned area 1206*b* were partially obscured during the sweep (but every section of the area was seen at least once), the estimation may consider whether objects could have moved in such a way that they could have remained in a sensor blackout zone during the whole sweep (e.g., as done by the vehicle 1208*b*). For some embodiments, predicting blind areas may include continually estimating locations of blind areas based on a plurality of sensor readings.

Blind area prediction on roads with visibility restrictions due to changing grade may use techniques analogous to blind area prediction methodologies for "T" intersections. Furthermore, adjusting expected effective sensor ranges in response to weather and lighting conditions may use an adaptive algorithm or a look-up table that maps metrics representing prevailing conditions to expected-sensor-range values. The AV determines potential blind areas in the foreseeable path up to a predefined distance or travel time (e.g., 10 seconds). The path may be taken from a current navigation route or a prediction of where the AV may go, based on the map, sensors, and other sources, such as driving history, vehicle speed, and typical driver behaviour, for example. A blind area prediction may be made by simulating what the sensors may see as the AV moves along the route (such as using an HD 3D map). This simulation may yield a map indicating potentially blind areas for each detectable object type at each point along the anticipated route.

As the AV moves along the road, for some embodiments, the AV may identify areas where a local dynamic map (LDM) differs from the HD 3D map. If differences occur, the AV may update the blind area map against the LDM using, for example, the procedure described previously. Additionally, the AV may use real-time scanning to locate space available for possible evasive maneuvers to avoid hitting vehicles and objects undetected due to blind areas. For example, if an AV is turning right at an intersection, the AV may use its left-, forward-, and right-facing sensors to detect if there is oncoming traffic. If there is not any detected oncoming traffic, then any unnoticed vehicles approaching from the left will have room to maneuver onto the oncoming lane in case of an emergency. This information may be used for determining minimum visibility requirements (or, for some embodiments, whether minimum visibility requirements are met).

For some embodiments, e.g., AR goggles may be used as an extension of the vehicle sensors. If the driver looks to the blind area with the goggles, the camera on the goggles may be used to detect if there are any on-coming vehicles in the blind area. This information may be transmitted from the goggles to the vehicle system, which may utilize this information as additional sensor information (e.g., for planning driving in automated driving mode).

For some embodiments, the AV may determine minimum visibility requirements along a route up to a maximum distance (e.g., a distance corresponding to 10 seconds of driving, although other distance definitions and corresponding times may be used). Minimum visibility requirements depend on multiple factors, such as the current and planned driving mode, route, and weather conditions. In some embodiments, minimum visibility requirements represent a minimum level of visibility by AV sensors to ensure safe operation in fully-autonomous driving mode. A visibility requirements determination may use the information about oncoming traffic and other information related to ability to maneuver (which may have been gathered previously). In some embodiments, determining minimum visibility requirements may include receiving minimum visibility requirements (or minimum sensor visibility requirements) from another networked entity and retrieving minimum visibility requirements from a storage device (e.g., a database). In some embodiments, determining may include, e.g., calculating locally minimum visibility requirements prior to travel and/or automatically calculating (and updating) during travel.

For some embodiments, the AV may monitor V2V messaging to determine whether other vehicles may cause a potential hazard in the blind area. If information is received by the AV from a nearby vehicle, this information indicates to the AV the presence of another vehicle. The AV may determine if the nearby vehicle is in the predicted blind area. The determination may be done by comparing received parameters (such as location, direction, speed, and acceleration) with a predicted blind area. A warning may be displayed to the driver in response to the AV detecting a nearby vehicle in a potential blind area.

For some embodiments, the AV may calculate a superposition of the blind areas against visibility requirements to determine whether the current/planned driving mode is feasible for the road section. Some embodiments of driving modes may include automated, supervised, and manual driving modes, some examples of which are described below.

For automated driving mode, the AV may proceed through the road section without user involvement. For supervised driving mode, the user may confirm that a blind area does not pose a threat and may be prepared to stop the AV (e.g., by requiring a foot be resting on the brake). For manual driving mode, the user may drive manually through a road section. Based on visibility requirements and predicted blind areas, the AV may determine if the requirements for a driving mode are met for a given road section. This determination may be done by comparing the predicted blind areas to the areas of required minimum visibility (or a visibility area threshold). An overlap may mean a sensor view is restricted. For some embodiments, determining whether minimum sensor visibility requirements are met may include determining a minimum visibility to navigate a driving route for a visibility area threshold. The AV may select a driving mode update that may be: (i) no change, (ii) supervised driving mode entry, or (iii) manual driving mode required, for some embodiments. For some embodiments, determining whether minimum sensor visibility requirements are met may include determining a percentage of minimum visibility areas covered by a field-of-view (FOV) of one or more sensors and determining if the percentage exceeds a visibility area threshold.

For a driving mode update of no change, if visibility is not restricted, the vehicle may continue in automated or manual driving mode. Manual driving mode may be supported by an ADAS system. The driver may not be alerted if approaching the road section.

For a driving mode update of supervised driving mode entry, if visibility is restricted in one area that fits within the driver's view, and an estimated time of arrival (which, e.g., may be calculated based on speed limit or the speed of another vehicle traveling the same route, for example) for potential vehicles approaching from the blind area is farther away than a predefined safety limit (e.g., a distance corresponding to 3 seconds of driving, although any suitable distance or length of time may be used), which may include a calculation based on the speed limit, the AV may continue in manual mode or change from automated to supervised driving mode. In some embodiments, in supervised driving mode, the AV notifies the driver of the blind area (e.g., using an AR projection device) and informs the driver that in order to continue in automated driving mode, the driver must observe the blind area and be prepared to stop the vehicle in case of danger. In some embodiments, the driver must actively acknowledge the system prompt to continue operating the vehicle in automated driving mode.

In some embodiments, a driving mode update to manual mode may be initiated, for example, if more than one blind area is detected, or if the estimated time of arrival for potential vehicles approaching from the blind area(s) is less than the predefined safety limit, automated driving may not be permitted even under driver supervision.

Various other factors may affect the driving mode determination. For example, an oncoming and nearby traffic scan may affect the driving mode determination. As the AV reaches the road section that may be affected by a blind area, the sensors may scan the side of the road for any pedestrians, potential evasive areas (e.g., curbs without obstacles and open bus stops), and oncoming traffic may determine the possibility of lateral maneuvering for the road section. If there is room to maneuver, the predicted blind areas (or a minimum visibility requirement, and/or a safety limit) may be changed to account for an approaching vehicle and to provide room for an evasive action in case a hazard is encountered. An evasive area on the side of the road may be used by the AV in case a sudden hazard, which may also be accounted for in blind area/minimum visibility requirement determination.

Another factor that may affect the driving mode may relate to the temporally-based blind area prediction. In determining the driving mode, a blind area prediction module may calculate several estimates based on extrapolating the speed of the AV when approaching the road section. If the vehicle is unable to see an area entirely at one moment but rather in sections (refer to FIGS. 12A-12C), the duration of an area scan may affect the vehicle's driving mode selection and current driving plan. For example, if an area scan takes 4 seconds for the AV 1202 to travel from its position in FIG. 12A to its position in FIG. 12B, the blind area may be increased in FIG. 12C by the distance a vehicle on the crossing road may travel in 4 seconds at the speed limit. The AV may determine that the minimum visibility required for driving through the crossing in automated mode will not be met. However, if the AV changes the current driving plan so that the same segment takes only 3 seconds, the blind area may be smaller, whereby the visibility requirements may be met.

For some embodiments, depending on the selected driving mode, the vehicle may inform the user of the blind areas, potential nearby vehicles within the blind areas, and of the required level of user involvement. Informing the user may be done using visual, aural, and/or haptic systems or devices, such as by using an AR (e.g., HUD or goggles), a dashboard display (e.g., a top-down navigator view), LEDs around the cockpit showing the general direction of the blind area, or 3D audio. If supervised driving mode or manual control is used, the driver may be instructed to put his or her foot on the brake and to prepare to stop the vehicle in case of a hazard, or to be prompted to actively confirm that the vehicle may proceed through the road section under user monitoring. The AV also may monitor a user's movements, such as head direction, to determine if the user is complying with driving mode requirements, and the AV may change the driving mode if driving mode requirements are met (or not met).

The system may provide information on potential hazardous blind areas in different stages if the vehicle is approaching and maneuvering through an intersection. The system may predict blind areas well before the AV is at the intersection (e.g., 100-200 m before the intersection). The predicted information may be communicated to a driver/operator in several different ways. For some embodiments, information is displayed via a dashboard/driver main console UI warning (icon). For some embodiments, information is displayed via a dashboard navigation UI as an indication of a potentially-hazardous blind area overlaid over a (navigation) map. For some embodiments, information may be displayed via an AR HUD as an indication of a potentially-hazardous blind area overlaid over an image of a real-world environment.

Figure 13A:
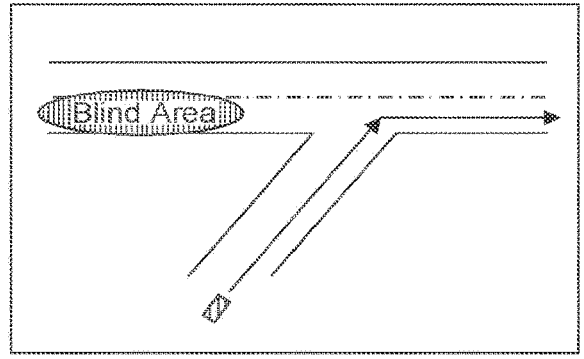
FIG. 13A is a schematic plan view illustrating an example of AR/MR visualization of predicted blind area at a turning point according to some embodiments.

FIG. 13A depicts an example navigator-style AR visualization of predicted blind area at a turning point, in accordance with some embodiments. FIG. 13A depicts blind area information presented via the dashboard navigation UI 1300a as an indicated region, aligned and overlaid on top of the navigation's map.

At the intersection when the AV approaches (or reaches) the turning point, the blind area and vehicle warning information may be displayed. For some embodiments, information may be displayed via a dashboard/driver main console UI to alert occupants of a potentially-hazardous blind area. For some embodiments, information may be displayed via the dashboard/driver main console UI to direct attention towards the direction of the potential blind spot, and the AV will perform surveillance in other directions. For some embodiments, information may be displayed via a navigator UI as a timely alert of "potential hazardous blind area" by using the map, overlaying layer, and visual effects. For some embodiments, information may be displayed to indicate a potentially-hazardous blind area on a side window or front windscreen such that it is overlaid on the real-world blind area from the driver's point of view. For some embodiments, information may be displayed to indicate a potentially-hazardous blind area by overlaying the information over a portion of the display of an HMD worn by the driver for the real-world blind area from the driver's point of view. For some embodiments, information may be displayed by indicating the potentially-hazardous blind area on the left or right by using an LED light strip at the corresponding door (by the lower edge of the side window). The LED light strip 1306*b* may contain, for some embodiments, green LEDs 1310*b*, 1312*b* and red LEDs 1308*b*, which may be illuminated according to the angle of the driver's gaze compared with the relative location of the blind area. For some embodiments, these display methods may be combined.

Figure 13B:
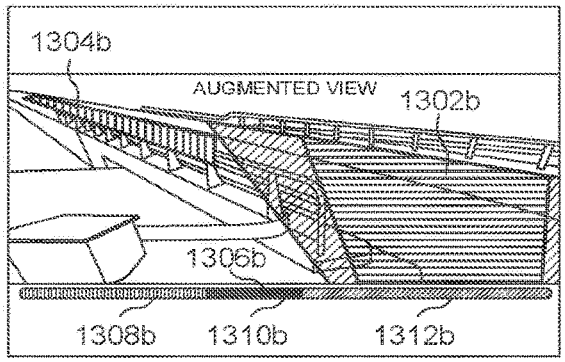
FIG. 13B is a schematic perspective view illustrating an example AR visualization of sensor range and field-of-view at a turning point according to some embodiments.

FIG. 13B depicts an example of a map-overlay and led strip indicator style AR visualization of sensor range and field-of-view at a turning point, in accordance with at least one embodiment. FIG. 13B depicts a driver's view 1300*b* comprising an augmented view of the road broken up into a high-visibility area 1302*b* and a potential blind area 1304*b*. For some embodiments, an LED strip 1306*b* may be displayed near the bottom of the display. The LED light strip 1306*b* may contain LEDs (which may be red and green for some embodiments) which are illuminated according to how well the angle of the driver's gaze matches with the blind area. For the example shown in FIG. 13B, red LEDs 1308*b* may align with the horizontal width of the potential blind area 1304*b*. Light green LEDs 1312*b* may align with the horizontal width of the high-visibility area 1302*b*. Dark green LEDs 1310*b* may be an area with some sensor coverage but not enough coverage to be designated a high-visibility area. For some embodiments, other colors may be used for the LED strip 1306*b*. The AR visualization 1304*b* may be rendered on a HUD and aligned with the predicted blind area.

Figure 14:
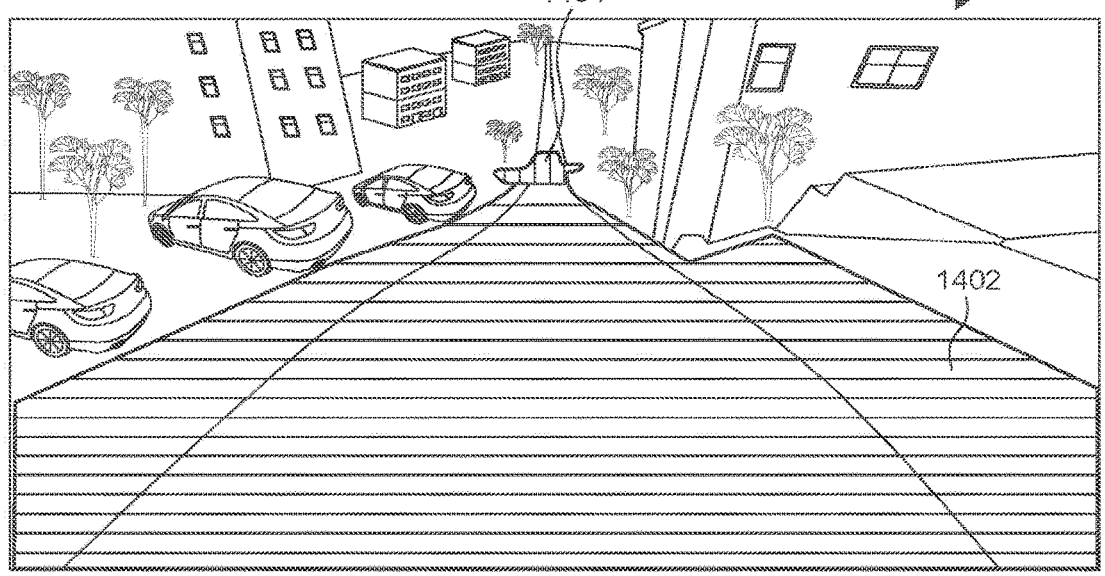
FIG. 14 is a schematic perspective view illustrating an example AR visualization of sensor range and field-of-view for a declining road according to some embodiments.

FIG. 14 depicts an example of a style of AR visualization of sensor range and field-of-view on a decline, in accordance with at least one embodiment. FIG. 14 depicts an environment with a decline, followed by a flat area, and followed by another decline that may impact object detection by a vehicle's sensors. The sensors may be oriented along the decline, and the sensors' FoVs may max out in the vertical direction. In the flat section, the sensors may be unable to detect objects past the intersection because the road section following the intersection declines steeply and the sensors may overshoot the road. In FIG. 14's augmented view 1400*a* blind area AR visualization 1404 and a region of trusted sensor coverage 1402 are shown. The AVs current sensor coverage is indicated by the horizontal slashes 1402 (which may be shown in green in some embodiments). Based on high-definition map data, the AV may determine that due to the steep decline, the AV's sensors are unable to detect objects past the flat section in the forthcoming intersection. The potential blind area may be indicated (or highlighted) to the driver by overlaying (or projecting) vertical slashes (in some embodiments, red may be used instead) over the blind areas of the AR visualization of a map.

FIG. 15 is a schematic perspective view illustrating an example of a style of AR visualization of sensor range and field-of-view and a warning of another potential vehicle, in accordance with some embodiments. AV sensors may be unable to detect beyond the apex of a hill. A vehicle approaching from the backside may be unable to detect the user's vehicle. However, if the approaching vehicle is connected via V2V messaging, a V2V message broadcast may be received and parsed by the AV. FIG. 15 depicts an AR visualization example 1500. A region of high sensor visibility 1502 is indicated by horizontal slashes (or e.g., colored green). The vehicle's sensors may be unable to detect past the apex of the hill. The apex may be marked as a blind area 1504 and may be indicated using vertical slashes (or e.g., colored red). A blind area element 1504 may be an augmented reality visualization of predicted blind areas. In addition, the AR HUD (or other AR tracking and projection device or system) may display a warning 1506 of a potential vehicle in the blind area that may be undetected (or unseen). The AV may display the warning 1506 in response to a received V2V message from a nearby vehicle.

FIG. 16 depicts an example of a style of AR visualization of sensor range and field-of-view and a prompt to select driving mode, in accordance with some embodiments. In some embodiments, as the AV approaches the blind area, the vehicle's sensors confirm and detail the blind area. The AV initially may be in automated driving mode but may determine that it cannot proceed through the blind area without help from the driver. The driver gets a reminder of the current route and a prompt asking whether to engage supervised driving mode, or to engage manual control. FIG. 16 depicts an example AR visualization 1600. A region 1602 of high sensor visibility may be indicated by horizontal slashes (or e.g., colored green). The element 1604 may be an augmented reality visualization of predicted blind areas. In addition, the AR HUD (or other AR tracking and projection device or system) shows a warning 1606 of a potential vehicle in the blind area. The AV may display a warning 1608 in response to a received V2V message from a nearby vehicle.

Even if the intersection in FIG. 16 had green traffic lights instead of a stop sign, the vehicle may be unable to proceed in automated mode, or may proceed very slowly, because the vehicle may be unable to detect objects past the intersection. In that case, driver supervision may help greatly. If an AV is moving under driver supervision, the AV may communicate with (or transmit data to) nearby vehicles via V2V messaging to indicate that the AV is moving onto a road section over which the AV may not have direct sensor vision. The message may indicate that the AV is moving under driver supervision, and the message may contain a description (e.g., as coordinates) of the blind area and planned courses of action. Other vehicles (and vulnerable road users, VRUs) may use the information to plan their speed and trajectory, to warn their drivers (if in manual driving mode), and to confirm to the AV that an indicated course of action is permissible.

FIG. 17 is a flowchart 1700 illustrating an example method for predicting blind areas and displaying a visualization corresponding to the predicted blind areas according to some embodiments. For some embodiments, a predicted driving route, sensor ranges of sensors on an autonomous vehicle (AV), and sensor field-of-view (FOV) data may be received 1702. Whether minimum sensor visibility requirements are met along the predicted driving route may be determined 1704. Blind areas along the predicted driving route also may be predicted 1706, wherein blind areas are determined to have potentially diminished sensor visibility. An augmented reality (AR) visualization of the blind areas using an AR display device may be displayed 1708.

Figure 18:
FIG. 18 is a flowchart illustrating an example process for predicting blind areas and displaying a visualization corresponding to the predicted blind areas according to some embodiments.

FIG. 18 is a flowchart 1800 illustrating an example method for predicting blind areas and displaying a visualization corresponding to the predicted blind areas according to some embodiments. For some embodiments, a method may include: predicting 1802 blind areas along a driving route of an autonomous vehicle (AV) based on expected limitations of sensors; and providing 1804 an indication of the predicted blind areas using augmented reality (AR) visualizations as the AV travels along the driving route.

Figure 19:
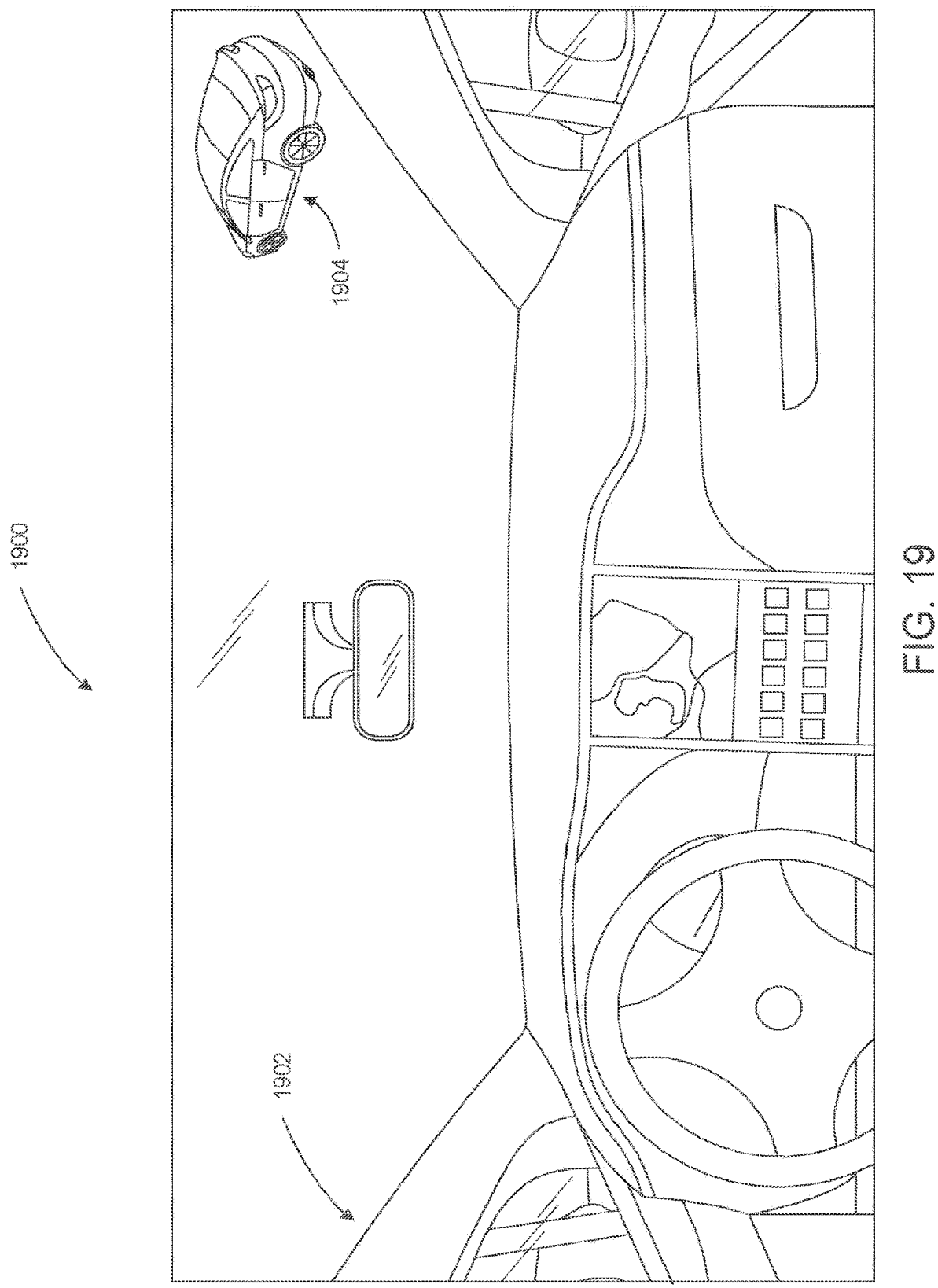
FIG. 19 is a picture showing an example of a driver's view from a first AV with a second AV within view of the driver according to some embodiments.

FIG. 19 is a picture 1900 showing an example of a driver's view from a first AV with a second AV within view of the driver according to some embodiments. For some embodiments, a first AV 1902 may communicate with a second AV 1904 via a V2V communications protocol.

Some embodiments of a method may include: receiving a predicted driving route, sensor ranges of sensors on a vehicle, and sensor field-of-view (FOV) data; determining whether minimum sensor visibility requirements are met along the predicted driving route; predicting blind areas along the predicted driving route, wherein the predicted blind areas are determined to have potentially diminished sensor visibility; and displaying an augmented reality (AR) or mixed reality (MR) visualization of the blind areas using an AR or MR display device.

For some embodiments, the vehicle is a partially-autonomous vehicle with at least one of a manual mode or a driver assist mode.

For some embodiments, the vehicle is a fully-autonomous vehicle.

Some embodiments of the method further may include: receiving map data (which may include, e.g., speed limits); and updating blind areas, wherein updating the blind areas may include comparing received map data with local dynamic map data.

Some embodiments of the method further may include: receiving blind area information from a second vehicle (which may include, e.g., only the location of the second vehicle); and determining that the second vehicle is in a blind area based on the blind area information.

Some embodiments of the method further may include responsive to determining that the second vehicle is in the blind area, displaying an icon indicating the second vehicle is in the blind area.

Some embodiments of the method further may include identifying blind area reduction techniques; and responsive to identifying blind area reduction techniques, moving the vehicle from a first position to a second position.

Some embodiments of the method further may include responsive to determining that the blind areas are predicted to overlap a visibility area threshold, updating a driving mode of the AV, wherein the minimum sensor visibility requirements include the visibility area threshold.

For some embodiments, predicting blind areas may include determining visibility areas at a plurality of locations along the predicted driving route.

For some embodiments, determining visibility areas may include simulating sensor visibility at a plurality of locations along the predicted driving route using three-dimensional (3D) map data.

For some embodiments, predicting blind areas may include continually estimating locations of blind areas based on a plurality of sensor readings.

Some embodiments of the method further may include: tracking an orientation of the vehicle, wherein predicting blind areas is based on the orientation of the vehicle.

For some embodiments, displaying the AR visualization of the blind areas includes projecting the AR visualization using an in-vehicle augmented reality projection system to display the AR visualization.

For some embodiments, displaying the AR visualization of the blind areas includes overlaying highlighting on a map indicating the blind areas.

For some embodiments, displaying the AR visualization of the blind areas includes displaying an outline of areas on a map indicating the blind areas.

Some embodiments of the method may further include determining the minimum sensor visibility requirements along the predicted driving route.

Some embodiments of the apparatus further may include: a set of sensors; a blind area prediction module configured to identify potential blind areas; a driving mode selection module configured to select a driving mode responsive to a comparison of the potential blind areas with a visibility area threshold; a communication module configured to receive vehicle-to-vehicle (V2V) messages; and an augmented reality (AR) display device.

Some embodiments of a method may include: determining whether minimum sensor visibility requirements are met along a driving route of an autonomous vehicle (AV); predicting blind areas along the driving route based on the minimum sensor visibility requirements; and displaying an augmented reality (AR) visualization of the blind areas.

For some embodiments, determining whether minimum sensor visibility requirements are met may include: determining a percentage of minimum visibility areas covered by a field-of-view (FOV) of one or more sensors; and determining if the percentage exceeds a visibility area threshold.

For some embodiments, predicting blind areas along the driving route may include determining areas along the route where sensor visibility range is less than a minimum sensor visibility range requirement, and the minimum sensor visibility requirements may include the minimum sensor visibility range requirement.

Some embodiments of the method may further include determining the minimum sensor visibility requirements along the predicted driving route.

Some embodiments of an apparatus may include: a processor; and a non-transitory computer-readable medium storing instructions that are operative, when executed by the processor, to perform one of the methods listed above.

Some embodiments of a method may include: predicting blind areas along a driving route of an autonomous vehicle (AV) based on expected limitations of sensors; and providing an indication of the predicted blind areas using augmented reality (AR) visualizations as the AV travels along the driving route.

Some embodiments of a method may include: detecting sensor blind spot area for a vehicle; receiving driving route information, sensor angle, and FoV data using various sensors (Radar, LIDAR, Sonar, Camera) of the vehicle; comparing the data received by sensors with static HD 3D map data and the local dynamic sensor range map; determining minimum visibility areas for the first vehicle, if still cannot see then the blind spot threshold has been reached; receiving V2V messages from a second vehicle which may indicate, e.g., a location of the second vehicle; determining if the second vehicle is in a blind spot or rendering the limited or no sensor detection spot area for the first vehicle on a display; rendering an icon for the second vehicle if the second vehicle is in the blind spot of the first vehicle; and presenting a mode change option to a user of the first vehicle (from self-driving to supervise or manual).

Some embodiments of an apparatus may include a display unit (e.g., goggles or HUD) for visualizing the sensor blind spot areas of a vehicle.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving a predicted driving route of a vehicle, and sensor range and sensor field-of-view (FOV) data for sensors on the vehicle;
predicting sensor blind areas along the predicted driving route of the vehicle, wherein the predicted sensor blind areas are determined from the received sensor range and sensor field-of-view data and the predicted driving route of the vehicle; and
displaying an augmented reality (AR) visualization of the predicted sensor blind areas along the predicted driving route of the vehicle using an AR display.

2. The method of claim 1, wherein the predicted sensor blind areas are areas along the predicted driving route where one or more of sensor range and sensor field-of-view are below a predetermined threshold.

3. The method of claim 2, wherein the AR visualization includes the predicted driving route.

4. The method of claim 3, wherein predicting sensor blind areas comprises determining a plurality of locations along the predicted driving route of the vehicle where the one or more sensor range and sensor field-of-view are below the predetermined threshold.

5. The method of claim 4, wherein predicting sensor blind areas comprises continually determining locations of blind areas along the predicted driving route.

6. The method of claim 5, wherein displaying the AR visualization of the sensor blind areas comprises projecting the AR visualization of the sensor blind areas using an in-vehicle augmented reality projection system.

7. The method of claim 6, wherein displaying the AR visualization of the sensor blind areas comprises displaying an outline of areas on a map indicating the sensor blind areas.

8. The method of claim 7, further comprising changing a driving mode of the vehicle based on the predicted sensor blind areas along the predicted driving route.

9. The method of claim 8, wherein the driving mode of the vehicle is one selected from the group consisting of manual mode, driver assist mode, and fully-autonomous mode.

10. The method of claim 1, further comprising:
receiving sensor range and sensor field-of-view (FOV) data for sensors on a second vehicle;
predicting sensor blind areas along the predicted driving route of the vehicle, wherein the predicted sensor blind areas are determined from the sensor range and sensor field-of-view data and the predicted driving route of the vehicle, and the sensor range and sensor field-of view data for sensors on the second vehicle.

* * * * *